(12) United States Patent
Sahita et al.

(10) Patent No.: US 11,144,479 B2
(45) Date of Patent: Oct. 12, 2021

(54) SYSTEM FOR ADDRESS MAPPING AND TRANSLATION PROTECTION

(71) Applicant: Intel Corporation, Santa Clara, CA (US)

(72) Inventors: Ravi L. Sahita, Beaverton, OR (US); Gilbert Neiger, Hillsboro, OR (US); Vedvyas Shanbhogue, Austin, TX (US); David M. Durham, Beaverton, OR (US); Andrew V. Anderson, Forest Grove, OR (US); David A. Koufaty, Portland, OR (US); Asit K. Mallick, Saratoga, CA (US); Arumugam Thiyagarajah, Folsom, CA (US); Barry E. Huntley, Hillsboro, OR (US); Deepak K. Gupta, Hillsboro, OR (US); Michael Lemay, Hillsboro, OR (US); Joseph F. Cihula, Hillsboro, OR (US); Baiju V. Patel, Portland, OR (US)

(73) Assignee: Intel Corporation, Santa Clara, CA (US)

(*) Notice: Subject to any disclaimer, the term of this patent is extended or adjusted under 35 U.S.C. 154(b) by 15 days.

(21) Appl. No.: 16/686,379

(22) Filed: Nov. 18, 2019

(65) Prior Publication Data
US 2020/0159673 A1 May 21, 2020

Related U.S. Application Data

(63) Continuation of application No. 15/088,739, filed on Apr. 1, 2016, now Pat. No. 10,515,023.

(Continued)

(51) Int. Cl.
*G06F 12/00* (2006.01)
*G06F 12/14* (2006.01)
(Continued)

(52) U.S. Cl.
CPC ........ *G06F 12/145* (2013.01); *G06F 9/45533* (2013.01); *G06F 12/1009* (2013.01);
(Continued)

(58) Field of Classification Search
CPC ................... G06F 9/45558; G06F 9/45583
(Continued)

(56) References Cited

U.S. PATENT DOCUMENTS 5,440,710 A * 8/1995 Richter ............... G06F 11/3648
                                                                711/207
7,275,136 B1   9/2007 Chen
(Continued)

*Primary Examiner* — Mohamed M Gebril
(74) *Attorney, Agent, or Firm* — Alliance IP, LLC

(57) ABSTRACT

This disclosure is directed to a system for address mapping and translation protection. In one embodiment, processing circuitry may include a virtual machine manager (VMM) to control specific guest linear address (GLA) translations. Control may be implemented in a performance sensitive and secure manner, and may be capable of improving performance for critical linear address page walks over legacy operation by removing some or all of the cost of page walking extended page tables (EPTs) for critical mappings. Alone or in combination with the above, certain portions of a page table structure may be selectively made immutable by a VMM or early boot process using a sub-page policy (SPP). For example, SPP may enable non-volatile kernel and/or user space code and data virtual-to-physical memory mappings to be made immutable (e.g., non-writable) while allowing for modifications to non-protected portions of the OS paging structures and particularly the user space.

20 Claims, 13 Drawing Sheets

Related U.S. Application Data

(60) Provisional application No. 62/301,403, filed on Feb. 29, 2016.

(51) Int. Cl.
*G06F 12/1009* (2016.01)
*G06F 12/1027* (2016.01)
*G06F 9/455* (2018.01)
*G06F 21/78* (2013.01)

(52) U.S. Cl.
CPC .......... *G06F 12/1027* (2013.01); *G06F 21/78* (2013.01); *G06F 2212/1016* (2013.01); *G06F 2212/1052* (2013.01); *G06F 2212/151* (2013.01); *G06F 2212/656* (2013.01); *G06F 2212/657* (2013.01)

(58) Field of Classification Search
USPC .............................................. 711/6
See application file for complete search history.

(56) References Cited

U.S. PATENT DOCUMENTS

| | | | | |
|---|---|---|---|---|
| 7,757,035 | B2* | 7/2010 | Durham | G06F 12/1036 711/6 |
| 8,645,665 | B1* | 2/2014 | Bennett | G06F 12/1036 711/206 |
| 2007/0168643 | A1* | 7/2007 | Hummel | G06F 12/1081 711/207 |
| 2013/0024598 | A1* | 1/2013 | Serebrin | G06F 12/10 711/6 |
| 2013/0091568 | A1* | 4/2013 | Sharif | G06F 21/50 726/22 |
| 2013/0276057 | A1* | 10/2013 | Smith | G06F 21/00 726/1 |
| 2014/0380009 | A1* | 12/2014 | Lemay | G06F 12/145 711/163 |
| 2015/0120979 | A1* | 4/2015 | Imada | G06F 13/24 710/269 |
| 2016/0350019 | A1* | 12/2016 | Koufaty | G06F 3/0622 |
| 2017/0249261 | A1* | 8/2017 | Durham | G06F 12/145 |
| 2017/0277632 | A1* | 9/2017 | Moriki | G06F 9/45558 |

* cited by examiner

Non-Asserted 4KB GLA Translation in Protected Linear Range (PLR) Example 500

SYSTEM FOR ADDRESS MAPPING AND TRANSLATION PROTECTION

PRIORITY

This is a Continuation Application of U.S. patent application Ser. No. 15/088,739 filed 04-01-2016, which claims benefit of U.S. Provisional Application 62/301,403, filed on Feb. 29, 2016, the contents of both of which are incorporated herein in their entirety.

TECHNICAL FIELD

The present disclosure relates to security for electronic devices, and more particularly, to systems that may employ a virtual machine manager to secure address mapping and translation.

BACKGROUND

"Virtualization" in a device may comprise at least one virtual machine (VM) to execute an operating system (OS), etc. in a software environment that emulates actual device hardware. In this manner, more than one VM may use a single set of device hardware to emulate multiple devices. Software executing in a guest VM may be unaffected by software executing in other guest VMs unless malicious software (e.g., "malware") in a guest VM is configured to attack other guest VMs. Intel CPU virtualization (Intel® VT-x) capabilities include Extended Page Tables (EPTs) that may be utilized by a Virtual Machine Monitor (VMM) to protect the VMM memory (also called host memory) from being accessed by untrusted guests. EPT structures may map guest physical memory addresses (GPA) to host physical memory addresses (HPA), whereas OS-managed guest paging structures may map guest linear addresses (GLA) to GPAs. When employing EPTs, the VMM is not required to shadow guest OS paging structures to administrate access control since the VMM may safely isolate/contain guest physical addresses to corresponding host physical addresses to maintain inter-guest memory isolation and host memory access restrictions. However, malware that is operating in a guest OS may freely alter GLA to GPA mappings, allowing for data substitution or code re-mapping attacks on the guest OS. An OS accessing a security-critical data structure may instead access malware installed data, may execute invalid code in an alternate GPA, etc. reached through a malicious mapping.

Moreover, EPT structures may be configured to protect individual memory pages through permissions such as, for example read only, read/write/execute, non-executable, etc. An attempt to access a memory page that violates the set permission may generate an interrupt to the VMM. While these protections may be effective, their granularity is limited to a per-memory page basis. As a result, an attempt to execute code in any portion of a memory page configured with a non-executable permission may cause an interrupt to be generated to the VMM, which may be costly to handle at least from the standpoint of data processing overhead in a device.

BRIEF DESCRIPTION OF THE DRAWINGS

Features and advantages of various embodiments of the claimed subject matter may become apparent as the following Detailed Description proceeds, and upon reference to the Drawings, wherein like numerals designate like parts, and in which:

Although the following Detailed Description may proceed with reference being made to illustrative embodiments, many alternatives, modifications and variations thereof may be apparent to those skilled in the art.

DETAILED DESCRIPTION

This disclosure is directed to a system for address mapping and translation protection. At least one embodiment may address an attack scenario wherein a guest OS page table is modified to cause unexpected operation and possibly damaging behavior in a device. Processing circuitry in a device may include a VMM capable of controlling specific GLA translations (e.g., within a protected linear range). This protection scheme may be implemented in a performance-sensitive manner, and may improve performance for critical linear address (LA) page walks over legacy operation by removing the cost of page walking the EPTs for critical mappings. Example uses may include monitoring critical mappings for protected kernel code and data pages for sensitive OS modules, OS security agents/kernel extensions, etc. In another embodiment usable alone or in combination with the above, certain portions of a page table structure may be selectively made immutable (e.g., non-writable) by a VMM or early boot process using a sub-page policy (SPP). For example, the SPP may enable non-volatile kernel and/or user space code and data virtual-to-physical memory mappings to be made immutable while still allowing for modifications to non-protected portions of the OS paging structures and particularly user space mappings. SPP may increase the granularity of memory protection against unauthorized read/writes, which may improve performance by reducing the number of exceptions/interrupts that may occur when a protected memory region needs to be accessed (e.g., read from or written to).

In at least one embodiment, the VMM may be provided with an alternate translation table such as, for example, a Hypervisor based Linear Addressing Table (HBLAT) that may be used by the processing circuitry to map sensitive GLA to hypervisor-enforced GPAs instead of using the OS page table that may is writable by guest software that may comprise untrusted software. Further, only a subset of the available linear address space may be subject to this alternate table lookup. If a fault occurs when looking up an address via the HBLAT, a VMexit instruction may be signaled to the VMM, or alternatively the fault may be reported as a legacy page fault.

Figure 1:
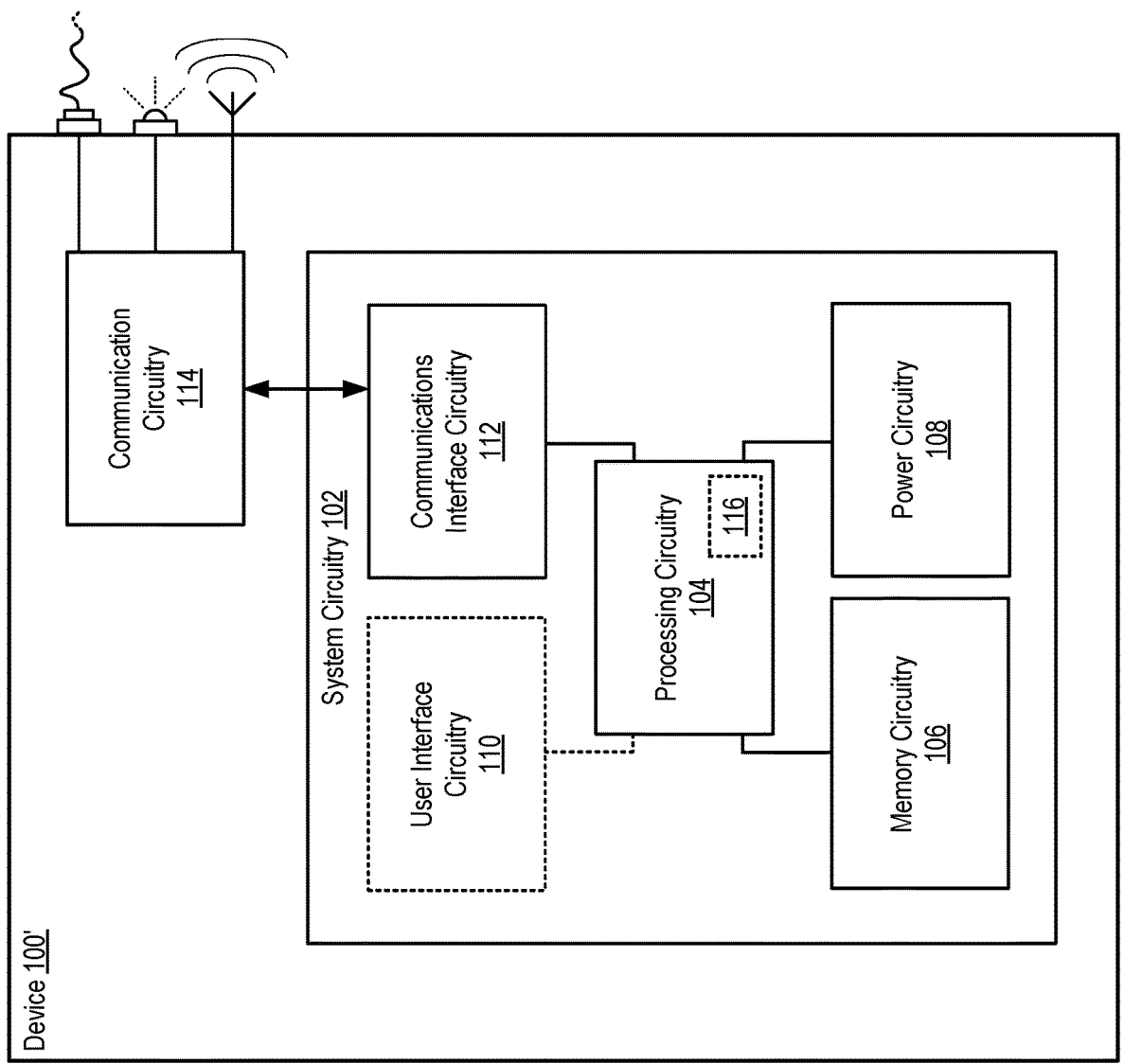
FIG. 1 illustrates an example configuration for a device usable in accordance with at least one embodiment of the present disclosure.

FIG. 1 illustrates an example configuration for a device usable in accordance with at least one embodiment of the present disclosure. The following may make reference to and/or may use terminology associated with virtualization technologies commonly implemented in various microprocessors from the Intel Corporation. These examples have been provided for the sake of explanation, and are not intended to limit any of the various embodiments consistent with the present disclosure to a particular manner of implementation. While the above example technologies provide a basis for understanding the various embodiments, actual implementations may employ other technologies existing now or developed in the future. Moreover, the inclusion of an apostrophe after an item number (e.g., 100') in the present disclosure may indicate that an example embodiment of the item is being illustrated merely for the sake of explanation herein.

As referenced herein, "VMM" may be used interchangeably with the term "hypervisor" as these are common names for the same virtual machine management entity commonly found in virtualization systems. While other abbreviations that may be referenced in the disclosure have been defined below, there may be instances where a common abbreviation may be left undefined in the specification. Applicant respectfully asserts that any undefined abbreviations would have been readily recognized by one of ordinary skill in the art at the time the various embodiments of the present disclosure were made. In addition, the terms "linear" and "virtual" may be used interchangeably when referring to a virtual memory address usable by software such as, for example, an operating system (OS) in a device.

FIG. 1 illustrates example device 100. While shown as one apparatus, device 100 may be implemented multiple devices configured to operate collaboratively. Example devices that are usable with system 100 may include, but are not limited to, a mobile communication device such as a cellular handset or a smartphone based on the Android® OS from the Google Corporation, iOS® or Mac OS® from the Apple Corporation, Windows® OS from the Microsoft Corporation, Tizen OS™ from the Linux Foundation, Firefox® OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, Surface® from the Microsoft Corporation, Galaxy Tab® from the Samsung Corporation, Kindle® from the Amazon Corporation, etc., an Ultrabook® including a low-power chipset from the Intel Corporation, a netbook, a notebook, a laptop, a palmtop, etc., a wearable device such as a wristwatch form factor computing device like the Galaxy Gear® from Samsung, an eyewear form factor computing device/user interface like Google Glass® from the Google Corporation, a virtual reality (VR) headset device like the Gear VR® from the Samsung Corporation, the Oculus Rift® from the Oculus VR Corporation, etc., a typically stationary computing device such as a desktop computer, server, a group of computing devices in a high performance computing (HPC) architecture, a smart television or other "smart" device, small form factor computing solutions (e.g., for space-limited applications, TV set-top boxes, etc.) like the Next Unit of Computing (NUC) platform from the Intel Corporation, etc.

Device 100 is presented only as an example device that may be usable in embodiments consistent with the present disclosure, and is not intended to limit embodiments disclosed herein to a particular manner of implementation. System circuitry 102 may manage the operation of device 100 and may comprise, for example, processing circuitry 104, memory circuitry 106, power circuitry 108, user interface circuitry 110 and communication interface circuitry 112. Device 100 may also include communication circuitry 114. While communication circuitry 114 is shown as separate from system circuitry 102, device 100 has been provided merely for the sake of explanation in regard to various embodiments. Variations may include some or all of the functionality of communication circuitry 114 being incorporated into system circuitry 102.

In device 100, processing circuitry 104 may comprise one or more processors situated in separate components, or alternatively one or more processing cores in a single component (e.g., in a System-on-a-Chip (SoC) configuration), along with processor-related support circuitry (e.g., bridging interfaces, etc.). Example processors may include, but are not limited to, various x86-based microprocessors available from the Intel Corporation including those in the Pentium®, Xeon®, Itanium®, Celeron®, Atom®, Quark™, Core i-series, Core M-series product families, Advanced RISC (e.g., Reduced Instruction Set Computing) Machine or "ARM" processors, microcontrollers, programmable logic controllers (PLCs), etc. Examples of support circuitry may include chipsets (e.g., Northbridge, Southbridge, etc. available from the Intel Corporation) to provide an interface through which processing circuitry 104 may interact with other system components that may be operating at different speeds, on different buses, etc. in device 100. Moreover, some or all of the functionality commonly associated with the support circuitry may also be included in the same package as the processor (e.g., such as in the Sandy Bridge, Broadwell and Skylake families of processors available from the Intel Corporation).

Processing circuitry 104 may be configured to execute various instructions in device 100. Instructions may include program code configured to cause processing circuitry 104 to perform activities related to reading data, writing data, processing data, formulating data, converting data, transforming data, etc. Information (e.g., instructions, data, etc.) may be stored in memory circuitry 106. Memory circuitry 106 may comprise random access memory (RAM) and/or read-only memory (ROM) in a fixed or removable format. RAM may include volatile memory configured to hold information during the operation of device 100 such as, for example, static RAM (SRAM) or Dynamic RAM (DRAM). ROM may include non-volatile (NV) memory circuitry configured based on BIOS, UEFI, etc. to provide instructions when device 100 is activated, programmable memories such as electronic programmable ROMs (EPROMS), Flash, etc. Other examples of fixed/removable memory may include, but are not limited to, magnetic memories such as hard disk (HD) drives, electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Discs™, etc.

Power circuitry 108 may include, for example, internal power sources (e.g., a battery, fuel cell, etc.) and/or external power sources (e.g., electromechanical or solar generator, power grid, external fuel cell, etc.), and related circuitry configured to supply device 100 with the power needed to operate. User interface circuitry 110 may include hardware and/or software to allow users to interact with device 100 such as, for example, various input mechanisms (e.g., microphones, switches, buttons, knobs, keyboards, speakers, touch-sensitive surfaces, one or more sensors configured to capture images, video and/or sense proximity, distance, motion, gestures, orientation, biometric data, etc.) and various output mechanisms (e.g., speakers, displays, lighted/flashing indicators, electromechanical components for vibration, motion, etc.). Hardware in user interface circuitry 110 may be included in device 100 and/or may be coupled to device 100 via wired or wireless communication. Consistent with the preset disclosure, some or all of user interface circuitry 110 may be optional in certain devices 100 such as, for example, rack/blade servers, very small form factor devices, etc. In such implementations, some or all of the user interface functionality may then be provided by another device (e.g., a remote terminal).

Communication interface circuitry 112 may be configured to manage packet routing and other control functions for communication circuitry 114, which may include resources configured to support wired and/or wireless communications. In some instances, device 100 may comprise more than one set of communication circuitry 114 (e.g., including separate physical interface circuitry for wired protocols and/or wireless radios) managed by centralized communication interface circuitry 112. Wired communications may include serial and parallel wired mediums such as, for example, Ethernet, USB, FireWire®, Thunderbolt™, Digital Video Interface (DVI), High-Definition Multimedia Interface (HDMI), DisplayPort™, etc. Wireless communications may include, for example, close-proximity wireless mediums (e.g., radio frequency (RF) such as based on the RF Identification (RFID) or Near Field Communications (NFC) standards, infrared (IR), etc.), short-range wireless mediums (e.g., Bluetooth®, WLAN, Wi-Fi, etc.), long range wireless mediums (e.g., cellular wide-area radio communication technology, satellite-based communications, etc.), electronic communications via sound waves, long-range optical communications, etc. In one embodiment, communication interface circuitry 112 may be configured to prevent wireless communications that are active in communication circuitry 114 from interfering with each other. In performing this function, communication interface circuitry 112 may schedule activities for communication circuitry 114 based on, for example, the relative priority of messages awaiting transmission. While communication interface circuitry 112 and communication circuitry 114 have been illustrated as separate circuitry, it is also possible for their functionality to be combined within the same set of circuitry.

The various examples of circuitry described in conjunction with different embodiments of the present disclosure may comprise hardware, or combinations of hardware and software in which, for example, the software may be implemented by the hardware to then configure certain functionality in the hardware, configure the hardware to perform one or more specific operations, configure other hardware, etc. For example, system 116 may comprise, for example, hardware and/or software to perform GLA translation with VMM enforcement. Hardware may comprise, for example, at least one microprocessor and corresponding support circuitry within processing circuitry 104, memory circuitry 106, etc. Software may comprise at least instructions, data, etc. stored within processing circuitry 104 and/or memory circuitry 106 wherein, when executed by processing circuitry 104, causes the general purpose processing circuitry 104 to be transformed into specialized processing circuitry to perform various operations such as shown in FIG. 2-13.

Virtual Machine Manager Enforcement of Guest Linear Address Translation

Figure 2:
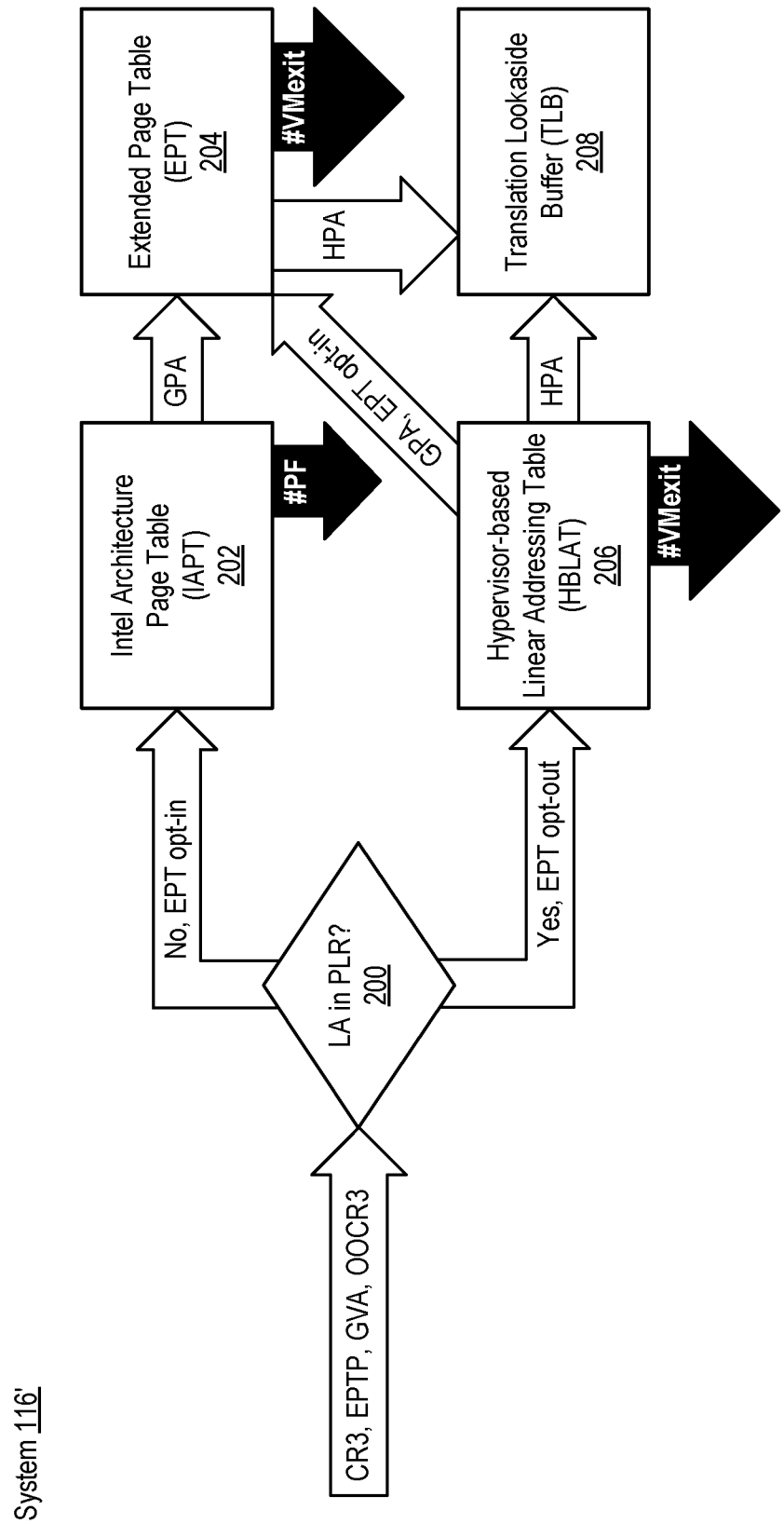
FIG. 2 illustrates an example of VMM enforcement of GLA translation in accordance with at least one embodiment of the present disclosure.

FIG. 2 illustrates an example of VMM enforcement of GLA translation in accordance with at least one embodiment of the present disclosure. Existing approaches including, for example, a shadowing page table implemented in software such as an OS or EPT-based edit control of OS paging structures require a combination of frequent exiting to intercept events such as CR3 loads (e.g., from the address translation register in the processing circuitry), INVLPG and PF events (e.g., for shadowing) or EPT write violations due to OS edits and accessed/dirty (A/D) bit updates performed by a page walker (e.g., circuitry to traverse the page tables in the processing circuitry for page table edit control algorithms, etc.). These software approaches may be very expensive to implement due to overhead caused by, for example, frequent VMexit and VMM emulation of guest software accesses. Other approaches consist of additional page walks performed after processing circuitry 104 performs the legacy IA/EPT nested page walk. Those approaches have the cost associated of the additional walk, and to optimize require additional HW caching structures.

Consistent with the present disclosure, performance overhead and code complexity of the VMM to enforce guest page mapping assertions may be reduced by a significant amount by not forcing the VMM to implement any page-table edit monitoring, page-table shadowing algorithms or additional page walk structures. This approach may also be efficient in terms of processing circuitry implementation since it reuses existing page walk and page walk structure caches. In at least one embodiment, the translation of linear addresses in VMX non-root operation may be changed.

System 116' in FIG. 2 comprises an address translation that may be performed by at least processing circuitry 104. In the example address translation, a command including, for example, a CR3 control register load, an EPT pointer (EPTP), a new control register "Opt-Out CR3" or "OOCR3" load, etc. may be received in system 116'. A determination may be made at 200 as to whether a linear address (LA) received in the command is in a protected linear range (e.g., a range of memory addresses that are protected by the processing circuitry). If the LA is not in the PLR, then a traditional EPT page walk may be performed as shown at 202 and 204 (e.g., EPT opt-in). For example, the "page walk" may proceed through an Intel architecture page table (IAPT) 202, which may generate a GPA, or if a terminal or permission fault occurs a page fault (#PF) exception may be generated. The GPA may then be forwarded to EPT 204, which may then generate a hardware physical address (HPA), or on the occurrence of a terminal or permission fault, a VM exit may be reported to the VMM. The GVA, HPA and permissions may be provided to translation lookaside buffer (TLB) 208. TLB 208 comprises at least a memory cache to store recent translations of virtual memory to physical addresses for faster retrieval by processing circuitry 104.

If at 200 it is determined that the LA received in the command is in the PLR, then an EPT opt-out may occur. The data flow of the address translation may proceed to HBLAT 206, which may then translate the GVA a HPA or GPA, or the occurrence of a fault may cause a VM exit. In another embodiment, HBLAT 206 may map the GVA to a GPA, which would be mapped through the EPT 204 to complete the page walk. The GVA, HPA and page permissions resulting from HBLAT 206 (e.g., and in some embodiments with additional assistance from EPT 204) may then be forwarded to TLB 208 where it may be easily accessed by processing circuitry 104.

Different approaches are possible for HBLAT fault handling. A first example approach may comprise HBLAT faults causing a new VM exit to be reported to the hypervisor/VMM. This example approach to HBLAT fault handling is illustrated in FIG. 2. Other options for fault handing may include, for example, generating a legacy # PF for delivery to the guest OS on a HBLAT fault. This approach may require specific enlightenment of the guest OS # PF handler in regard to whether HBLAT EPT-opt-out entries need to be populated. Finally, a flexible control bit extension to the HBLAT PTE may be implemented (e.g., "Suppress # PF") that selects a # PF as the default response to a HBLAT fault unless the Suppress # PF bit is set. If the Suppress # PF bit is set, processing circuitry 104 may report the fault as a new HBLAT VM exit. The control bit may allow the VMM to retain control of pages from which access events are to be received since the VMM may have selected a lower permission than the guest OS desired for these asserted mappings. An alternative approach is to encode OS-requested permissions, hypervisor-desired (e.g., EPT) permissions, etc. in the HBLAT PTE such that a # PF or VM exit may be generated based on which permissions were violated with # PF being higher priority. In an embodiment where EPT permissions are used to restrict permissions for HBLAT mappings, the VMM may also enable Virtualization Exceptions to report the EPT violation to the OS as a # VE. The VMM may enable this on a per-page level via the EPT entry (EPTE) Suppress # VE control bit 63.

Figure 3:
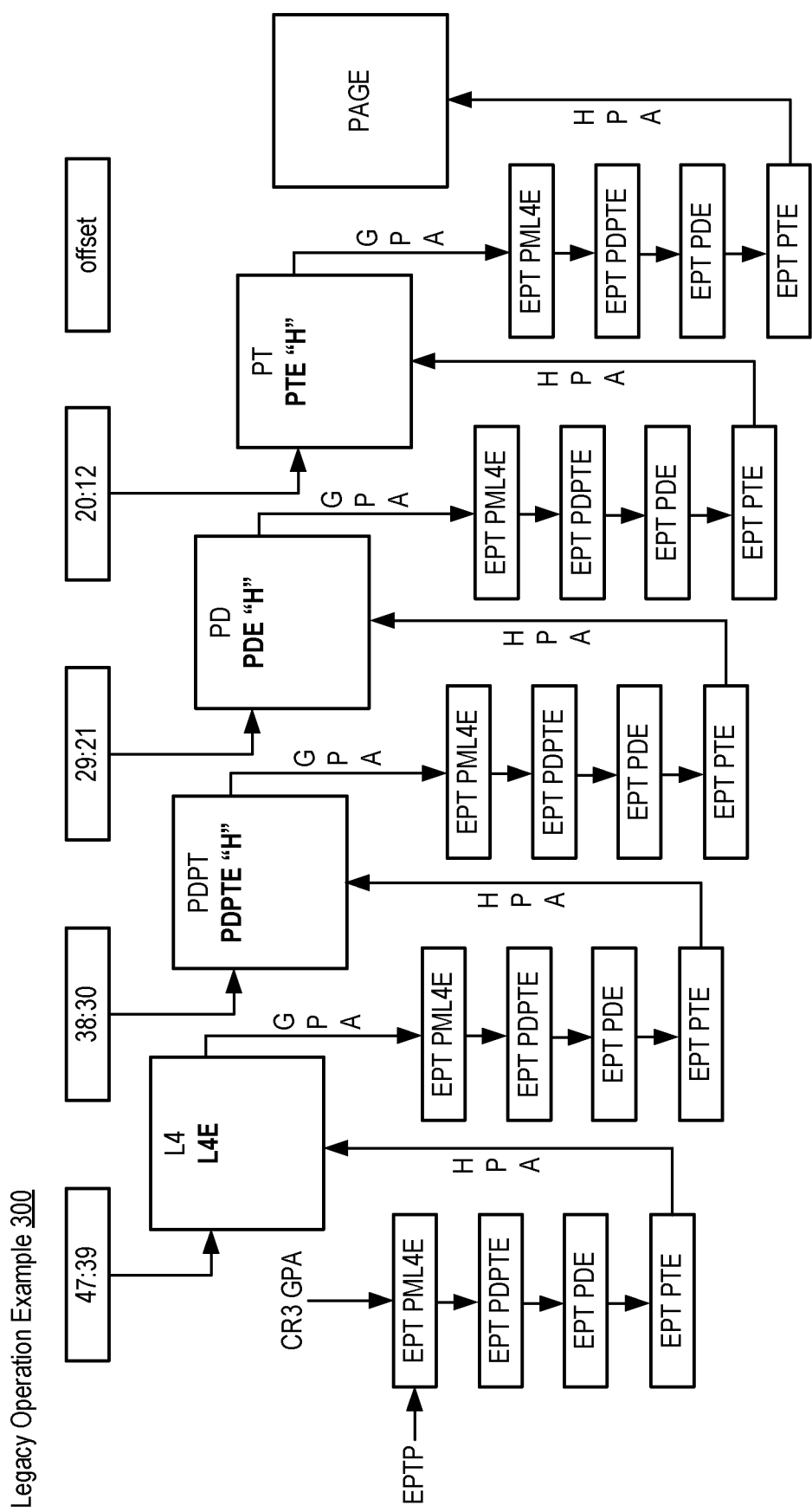
FIG. 3 illustrates a legacy operation example in accordance with at least one embodiment of the present disclosure.

FIG. 3 illustrates a legacy operation example in accordance with at least one embodiment of the present disclosure. Legacy operation of GLA translation is shown in example 300. With EPT, Intel Architecture 32 bit (IA32) paging-structure entries may hold guest-physical addresses. Processing circuitry 104 may translate these through EPT to obtain the final host-physical addresses. The translation may be performed by walking each table based on a portion of the linear address to obtain the GPA and then the HPA, which may eventually resolve to a memory location in memory circuitry 106.

Figure 4:
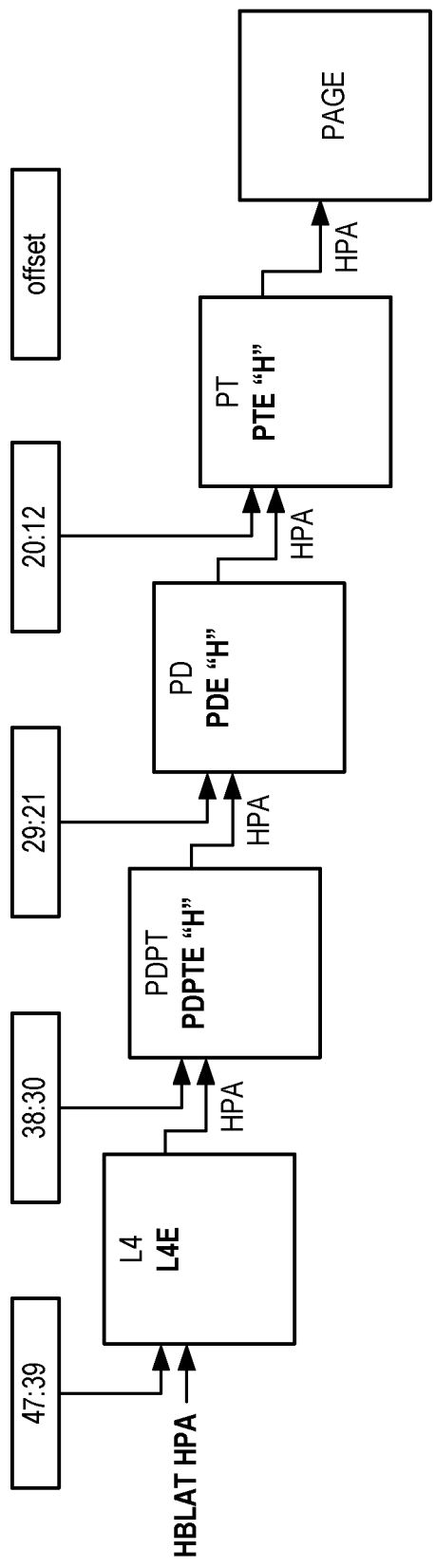
FIG. 4 illustrates an example of operation for a hypervisor-based linear addressing table (HBLAT) in accordance with at least one embodiment of the present disclosure.

FIG. 4 illustrates an example of operation for an HBLAT in accordance with at least one embodiment of the present disclosure. As demonstrated in HBLAT operation example 400, HBLAT 206 allows an opt-out of walking the EPT for some of the mappings, and may map the GLA to a final HPA without translation through EPT. Other embodiments may map a GLA to a final GPA without translating the HBLAT non-leaf entries through EPT, but subjecting the final GPA to EPT translation. Processing circuitry 104 may choose to walk the HBLAT based on top bit(s) of the GLA. Other embodiments may employ one or more ranges of guest linear addresses (e.g., PLR) to decide if the HBLAT should be walked. A page walk that opts out of EPT may opt back in during the walk via a new bit in the HBLAT IA32 paging-structure entries that indicates "EPT opt in". Once EPT is opted-into during the walk, either at the beginning of the walk or in the middle of the walk, opting out of it is not possible. In some embodiments the "EPT opt in" behavior may cause the walk to be started from the guest CR3 (GPA) instead of at an intermediate paging entry.

For critical mappings that, for example, need to be under VMM control, the VMM may create a HBLAT with the mappings for the protected GLA pages mapping to the required HPA. For example, the HPA may be derived from EPTs maintained by the VMM for the guest OS. Corruption of, tampering with, etc. critical OS mappings does not have any effect since the hypervisor-managed HBLAT is used to map critical GLA to the platform HPA. Approved aliases set up by the OS (e.g., trusted components of the guest) may be specified in the HBLAT, at the same time disapproved aliases may be prevented by removing the mapping for the GPA from the EPT structure used for the guest. The removal of the GPA may be executed alone or in combination with de-privileging the EPT mappings to be read-only, which may also prevent direct memory accessing (DMA) on these GPAs and implicit writes that processing circuitry 104 may performs during instruction execution. Both restrictions may be desirable for ensuring accesses for critical guest linear addresses occur only via those hypervisor-enforced mappings.

The paging-structure (PxE) caches for HBLAT may also be augmented. Each entry may be augmented with a new "EPT opt-in" bit as an output of PxE lookup which may be clear if the linear-address translation began with HBLAT 206 (e.g., linear address was selected based on PLR match criteria) and page walk did not encounter any entry (including the one being cached) that set the EPT-opt-in bit. This bit may affect how CPU uses this PxE-cache entry. If the EPT-opt-in bit is set, processing circuitry 104 may opt in to EPT after fetching next entry in the walk. If the bit is clear, EPT will not be used for the remainder of the HBLAT walk from this PxE-cache entry. In the embodiment where the "EPT opt-in" bit is used to cause a restart of the page walk from the guest CR3, the paging structure PxE caches may be augmented with a tag lookup (input) bit to cache whether the PxE was created via the HBLAT lookup or via the CR3 lookup.

In at least one embodiment, invalidation of TLBs and PxE caches is not modified. Also, address space identifier (ASID) tagging and ASID management is not modified. Alternatively, the TLB may be extended to signal a # PF with a special error code reported via the PFEC bit indicating whether the permission fault occurred due to a mapping created via the HBLAT walk or the guest CR3 walk. HBLAT table structure and operation is described in the following. HBLAT lookup may be performed on an in-memory hierarchical structure (e.g., like the IAPT) walked by a page miss handler (PMH) in processing circuitry 104 when the GLA for page walk that pass the selection criteria (e.g., based on LA bits). In an HBLAT walk, memory typing may be derived from port address translation (PAT) and memory type range registers (MTRRs) as normally done without EPT. The HBLAT structure may be sparsely filled with "EPT-opt-out" mappings, with most mappings specified as "EPT-opt-in". The HBLAT structure in memory may be rooted at a host physical base address specified in a new 64 bit control register OOCR3 accessed via the VMCS. HBLAT may be configured by the VMM and its memory must be EPT and Intel Virtualization Technology for Directed I/O (VT-d) protected like other VMM-managed data structures. At least one active OOCR3 control may be maintained in the virtual machine control structure (VMCS) to allow for utilization of the capability across guests. In at least one embodiment, the OOCR3 may be switched by the VMM or may be selected from a set automatically by processing circuitry 104 based on the CR3 loaded (e.g., CR3 or OOCR3) to allow for hypervisor-enforced guest linear translations that are specific to a specific address space and corresponding CR3 control register. In at least one embodiment, processing circuitry 104 may ignore HBLAT 206 if, for example, a CR0 control register paging bit (CR0.PG)=0 or a CR4 control register physical address extension bit (CR4.PAE)=0. EPT 204 may be used to perform legacy address translation if guest paging is off or in paging modes A and B. The OOCR3 register may point to a page map level 4 (PML4) table and may use a full 4-level walk, even with mode-C paging if, for example, the long mode active (LMA) bit in the extended feature enable register (EFER) is set to 1 (IA32_EFER·LMA=1). In mode C paging, linear addresses may be zero-extended to a full 64 bits. For future extensions to linear address width, corresponding additional paging levels may be added to HBLAT 206 to support EPT-opt-out translations enforced by the hypervisor.

On a TLB miss, processing circuitry 104 may perform a variety of actions. For example, processing circuitry 104 may complete a legacy IA/EPT walk and generate final HPA, perform a HBLAT walk and generate the final HPA or may perform a partial HBLAT walk followed by a partial legacy IA/EPT nested walk to lookup the final HPA and permissions cached in TLB 208. Alternatively, processing circuitry 104 may initiate an HBLAT walk, determine that an entry in HBLAT 206 (e.g., based on a bit set in the HBLAT entry) indicates a need to start the walk over from the CR3 register and instead walk the legacy IA 202 and EPT 204 because, for example, the entry is not protected per-process, not mapped to HBLAT 206, etc. This operation may be called a "restart," and may employ existing CR3 legacy IA/EPT structures, allowing per-process mappings of the non-asserted mappings. It may also indicate (e.g., using the same bit as above or another bit encountered during the HBLAT walk) that both HBLAT 206 and IA 202/EPT 204 should be walked, where HBLAT 206 may provide the correct linear-to physical address mapping and the IA 202/EPT 204 may be walked by the PMH from CR3 simply to update the A/D bits without using the CR3 legacy IA/EPT memory mapping. In this manner, OS software may be able to see and control the A/D bits in its copy of the paging structures while the correct linear-to-physical mappings are still asserted by the VMM-controlled structures (e.g., A/D bits may also be asserted in both sets of paging structures). Regardless of the particular actions that are executed, HBLAT terminal and permission faults may generate a new HBLAT VM exit to get the attention of the VMM. If a translation is entirely EPT opt-out, the TLB entry may allow all EPT permissions including read, write and execute (R/W/X).

Figure 5:
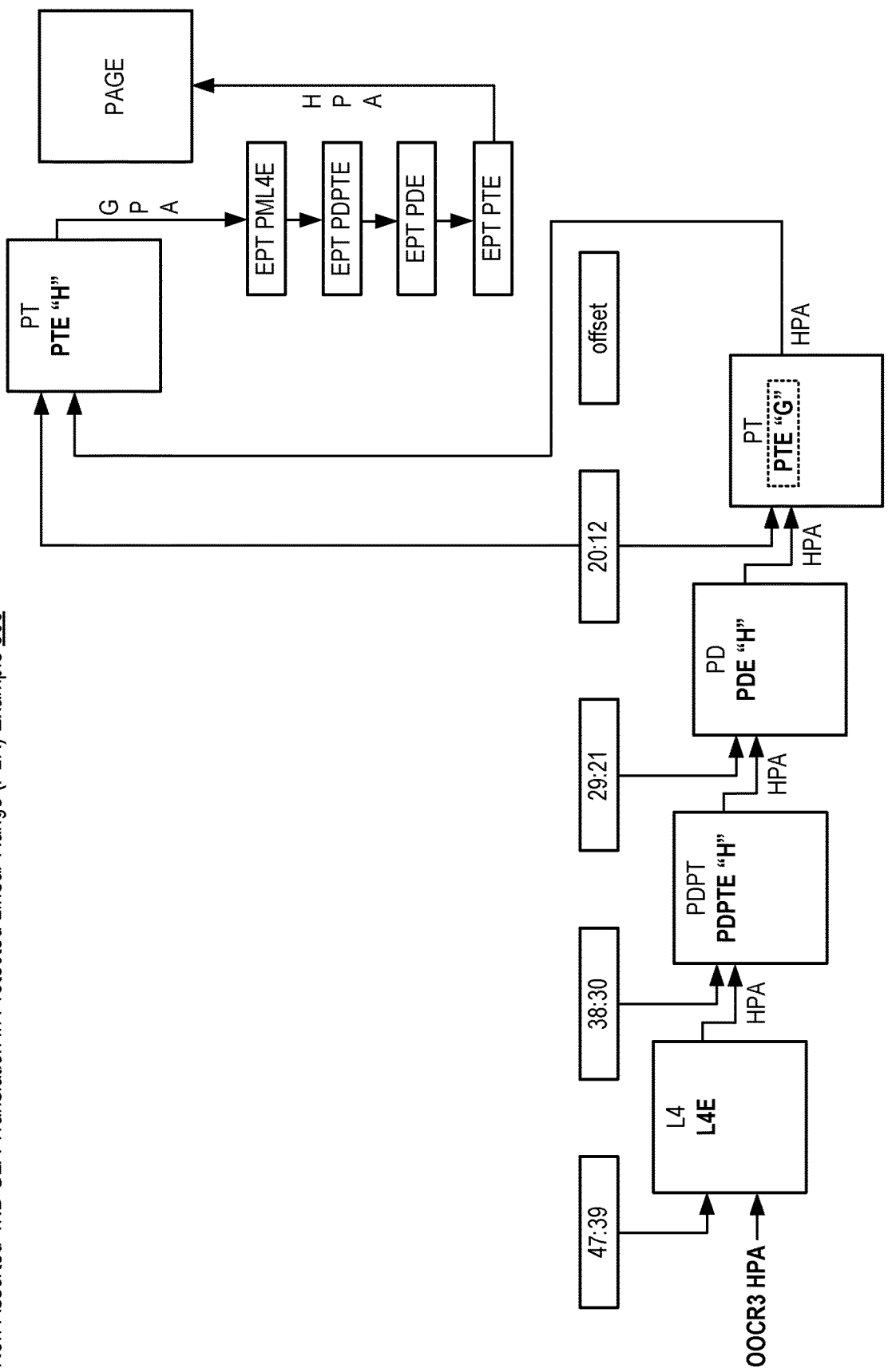
FIG. 5 illustrates an example of non-asserted 4 KB GLA translation in a protected linear range (PLR) in accordance with at least one embodiment of the present disclosure.
Figure 6:
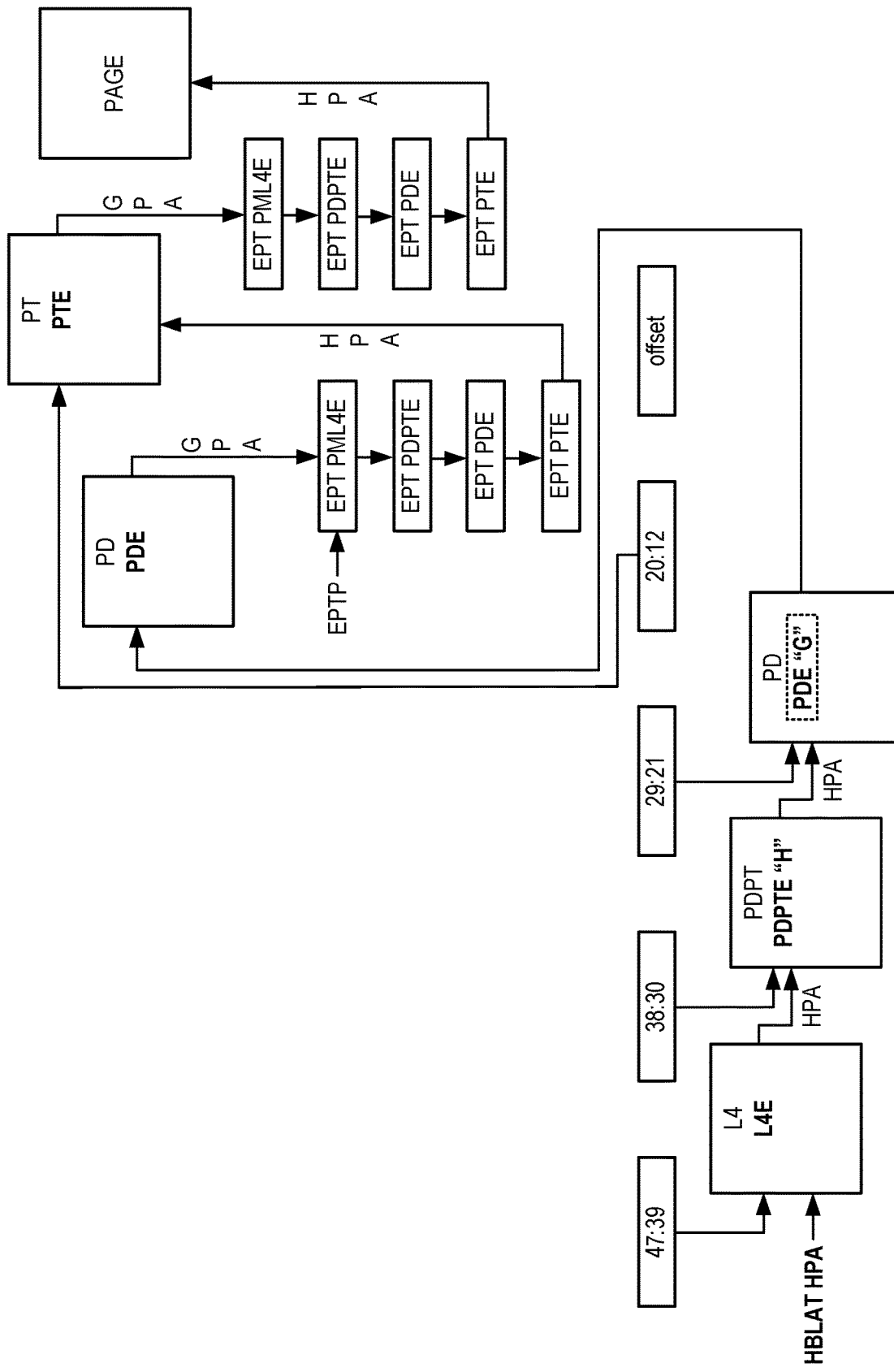
FIG. 6 illustrates an example of non-asserted 4 KB GLA translation in a protected linear range (PLR) in accordance with at least one embodiment of the present disclosure.

FIG. 5 illustrates an example of non-asserted 4 KB GLA translation in a protected linear range (PLR) in accordance with at least one embodiment of the present disclosure. FIGS. 5 and 6 demonstrate an ability to "opt-out" of HBLAT address translation and back into standard EPT address translation based on a bit (e.g., set by the VMM). Consistent with the present disclosure, special treatment of leaf entries within HBLAT 206 may use EPT-opt-in mappings to facilitate a reduction of hypercalls. To manage the EPT opt-in mappings in HBLAT 206, software in the guest OS (e.g., trusted software) may invoke hypercalls to setup each individual mapping. This invocation may cause large overhead if the frequency of changes to such "uncritical" mappings is too high. In at least one embodiment, special treatment of leaf entries allow guest OS software to manage such mappings without requiring hypercalls for each edit at the leaf level. In example 500, a walk may be an EPT "opt-out" when a leaf entry is encountered with EPT-opt-in bit set, which is illustrated in example 500 where the highlighted PTE "G" indicates an opt-out to return to "guest" paging as opposed to the "H" bit indicating "HBLAT" paging. The page walk may continue with EPT enabled, but may back up one level by re-using LA bits at the current level of the walk (e.g., in example 500, bits 20:12 in the LA where an EPT opt-in was encountered) to index into the GPA fetched from the last HBLAT EPT opt-in entry. The indexed GPA may be used to select a page table entry (PTE) or page directory entry (PDE) from that level to continue the walk with EPT enabled.

FIG. 6 illustrates an example of non-asserted 4 KB GLA translation in a protected linear range (PLR) in accordance with at least one embodiment of the present disclosure. Example 600 demonstrates another embodiment of handling EPT-opt-in wherein the legacy page walk may be restarted when the EPT-opt-in bit is encountered during the HBLAT lookup for a guest LA that, for example, matched the linear address bit(s) selection criteria. Alternately, a page walk may always begin with the HBLAT lookup, and on a fault/miss may continue with the legacy page walk via the CR3. In at least one embodiment, per-process mapping may be supported by, for example, enabling per-process mappings for non-asserted pages. These alternate approaches are expected to have a higher overhead than the optimization described above.

Figure 7:
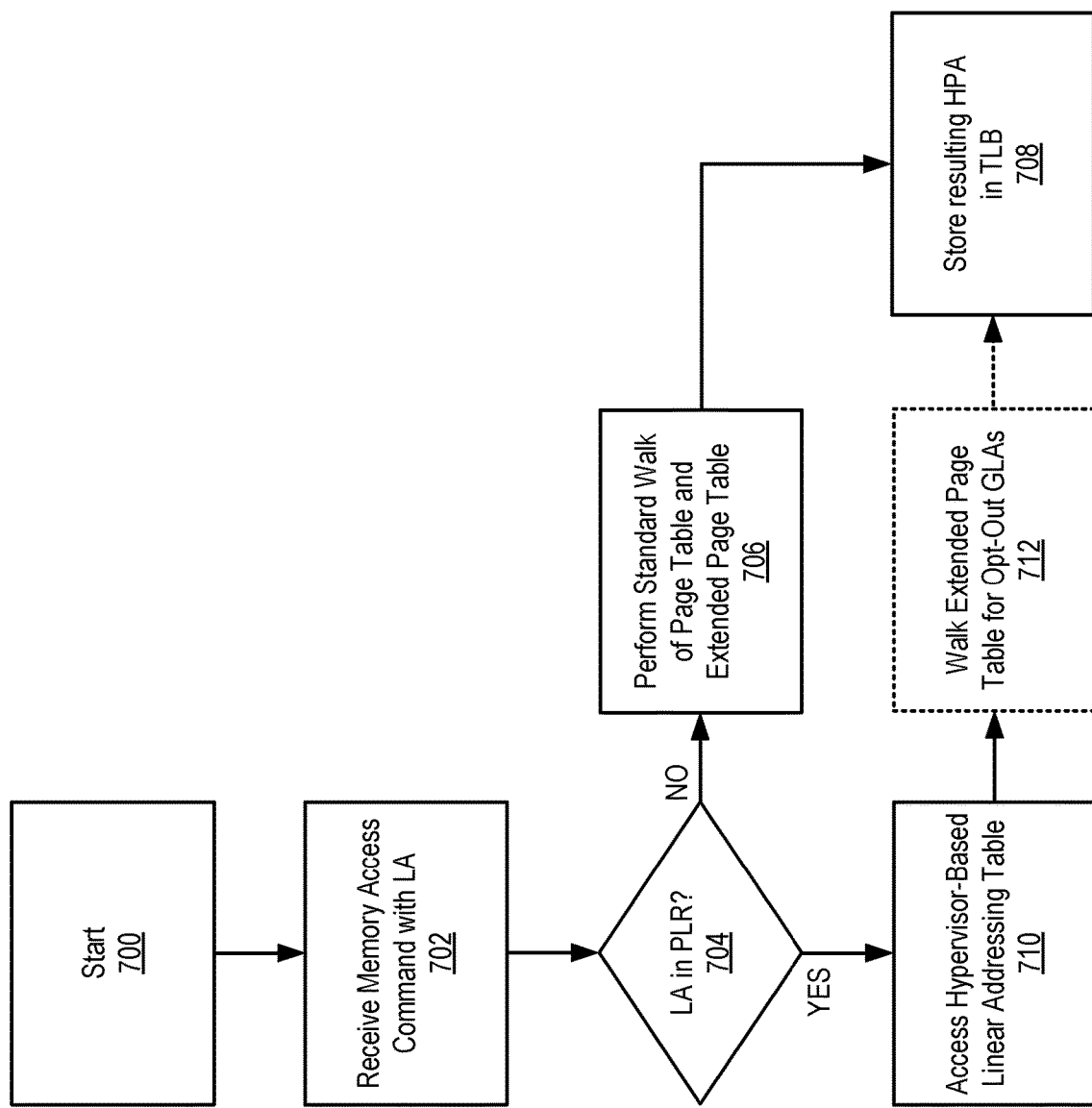
FIG. 7 illustrates example operations for GLA translation in accordance with at least one embodiment of the present disclosure.

FIG. 7 illustrates example operations for GLA translation in accordance with at least one embodiment of the present disclosure. Following start operation 700, in operation 702 a memory access command may be received. The memory access command may comprise at least an LA. A determination may then be made in operation 704 as to whether the LA received in the access command is in a PLR. If in operation 704 it is determined that the LA is not in the PLR, then in operation 706 a "standard" page walk may be performed (e.g., through at least one IAPT and at least one EPT). The HPA resulting from the page walk may be stored in a TLB in operation 708. If in operation 704 it is determined that the LA is in the PLR, then in operation 710 a page walk may be performed through at least one HBLAT. Depending on the implementation, optionally an EPT opt-in or restart may cause GLAs to be forwarded back to the guest paging structure for page walking from an intermediate entry in the guest paging structure or at the root CR3 of the guest paging structure, respectively. Operation 712 may be followed by a return to operation 708 to store the resulting HPA in a TLB.

Using Sub-Page Policy (SPP) to Selectively Protect Virtual-to-Physical Memory Mapping Linear (also known as "virtual") to physical memory mappings may be protected using a sub-page policy (SPP). An example of SPP is described in U.S. Published Patent Application 2015/0378633. In SPP, when processing circuitry 104 (e.g., the PMH) is walking EPT 204, the PMH may encounter EPT entries that have a bit set (e.g., an SPP bit), indicating that subpage permissions apply to the page. These pages may be cached in TLB 208 as "read-only" or "read/execute" based on EPT page-level permissions, so writes to the cached pages may be intercepted by processing circuitry 104 (e.g. in microcode). When a write is attempted to a SPP-asserted page, the processor may walk an SPP table based on the particular address of the page that software accessing the page is attempting to modify. For example, the SPP policy may be looked-up based on the page address, which can be a 48-bit or 52-bit, or another size, depending on paging mode (e.g., creating a need for different SPP table formats). The result of the SPP table walk may be a bit vector that indicates the portions of the page that are write-protected and the portions that are unprotected (e.g., depending on whether a corresponding bit in the bit vector is set). For example, 8-byte granularity may be achieved with a 512 bit vector, which may be an ideal granularity for providing page table protections in existing systems as page table entries are currently 8 bytes. If a specific portion to which a write is directed is write-protected, processing circuitry 104 may generate a fault or VM exit so that software (e.g., the OS) may then handle the policy violation. If writes are permitted for the specific portion to which the write is directed, processing circuitry 104 may override the read-only protection at the page-level and then directly write the data to the write-enabled sub-portion of the page. In at least one embodiment, this is also where masking may be applied to allow only specific/innocuous portions of an entry to be modified by software (e.g., A/D bits), while leaving the rest of the contents of a page table entry unchanged. In this instance, even if a page or sub-page is write-protected, processing circuitry 104 may allow software (e.g., the OS) to modify the innocuous bits designated by the masking. The application of the masking may be tied to identifying a particular memory page as a paging structure (e.g. as implied by the isPT and isRoot bits in a corresponding EPT entry for a page).

An OS may freely edit page table structures that are not "locked down" by a system of protection (e.g., EPT page permissions). However, certain portions of page table structures may be selectively made immutable by, for example, a hypervisor or early boot process utilizing SPP. This may enable non-volatile kernel and/or user space code and data virtual-to-physical memory mappings to be made immutable while still allowing for modifications to non-protected portions of the OS paging structures, and particularly the user space. A mechanism may also be defined to avoid exits or faults when switching between processes (e.g., changing the CR3 register) and ensure only correct CR3 values are used. Example mechanisms may include a CR3 target list or an identifier for CR3 target memory pages. An example of an identifier may be a bit set in an EPT leaf entry indicating that the associated GPA is an acceptable target of the CR3 register. Another example identifier may comprise a large bit map proportional to the number of pages in physical memory. For example, each bit may represent a 4K page in memory. Each bit position may indicate whether or not a corresponding page in memory can be a target of the CR3 register (e.g. used as a root paging structure). The bitmap may provide a way of designating authorized CR3 target pages without necessarily requiring the use of virtualization technology (e.g., VMM) when using SPP. When software executes a change in the CR3 register (e.g., executes a MOV CR3), processing circuitry 104 may simply check the corresponding bit position in the bitmap to determine if CR3 is targeting an authorized paging structure (e.g., PML4). This bitmap may then be write-protected, and the SPP indication bits may be implemented in the paging structures of the IA (e.g., page tables 202) instead of the VMM's EPT 204. Using SPP as set forth above may enable VMM-protected mappings and native protections using an early boot loader, or another trusted execution environment (TEE), to lock down specific portions of paging structures. For example, early-boot operations may consult the bitmap to protect immutable portions of paging structures and create a pool of valid CR3 target pages and paging structures prepopulated with the correct immutable mappings. In addition, SPP protection may be implemented alone or in combination with another memory protection system such as the HBLAT discussed above.

Moreover, any or all of the various bits discussed herein (e.g., SPP bit, isRoot, WP/isPT, verifyPageMap) may alternatively be implemented as a bitmap such as described above. EPTs may be used to remap guest physical memory for multiple VMs, but that adds overhead if VM functionality is not required. An alternative embodiment to defining those bits in the EPTs is to employ a direct-mapped bitmap where each bit position may indicate whether a corresponding physical page in memory has an SPP policy, and/or isRoot/CR3Target and/or isPT/WP, and/or requires a verifiedPageMap. Instead of walking the EPT tables to determine the bit settings for a page, processing circuitry 104 (e.g., PMH) may simply check the bitmap for these policies on the corresponding physical page mappings (e.g., one memory access vs. walking a multilevel table).

Consistent with the present disclosure, efficient protection of select virtual to physical memory mappings may be enabled employing SPP structures that provide write protections for memory regions less than the size of a page (e.g., finer than 4 KB). This allows write protections to be applied to subsets of paging structure pages, allowing the OS to edit the pages and portions of pages that are not rendered immutable by SPP, while providing continuous protection for the immutable portions of paging structure pages. SPP may enable virtual-to-physical memory mapping protection (e.g., write-protections) without triggering faults or exits as non-immutable portions of paging structures may still be freely edited by an OS. Because SPP does not impact the PMH when walking paging structures, it is more efficient than adding additional tables (e.g., a restricted linear check (RLC) table) that extend the walk. Also, identifying a reusable set of CR3 targets enables process switching between protected paging structures without triggering any faults or exits. Finally, with cooperation from the OS, VM exits, faults and emulation that would normally be required for page table edit control (PTEC) techniques may be prevented by allowing the OS to freely edit select portions of paging structures. Avoiding exits and emulation may dramatically reduce the complexity of this approach over alternative protection schemes.

Figure 8:
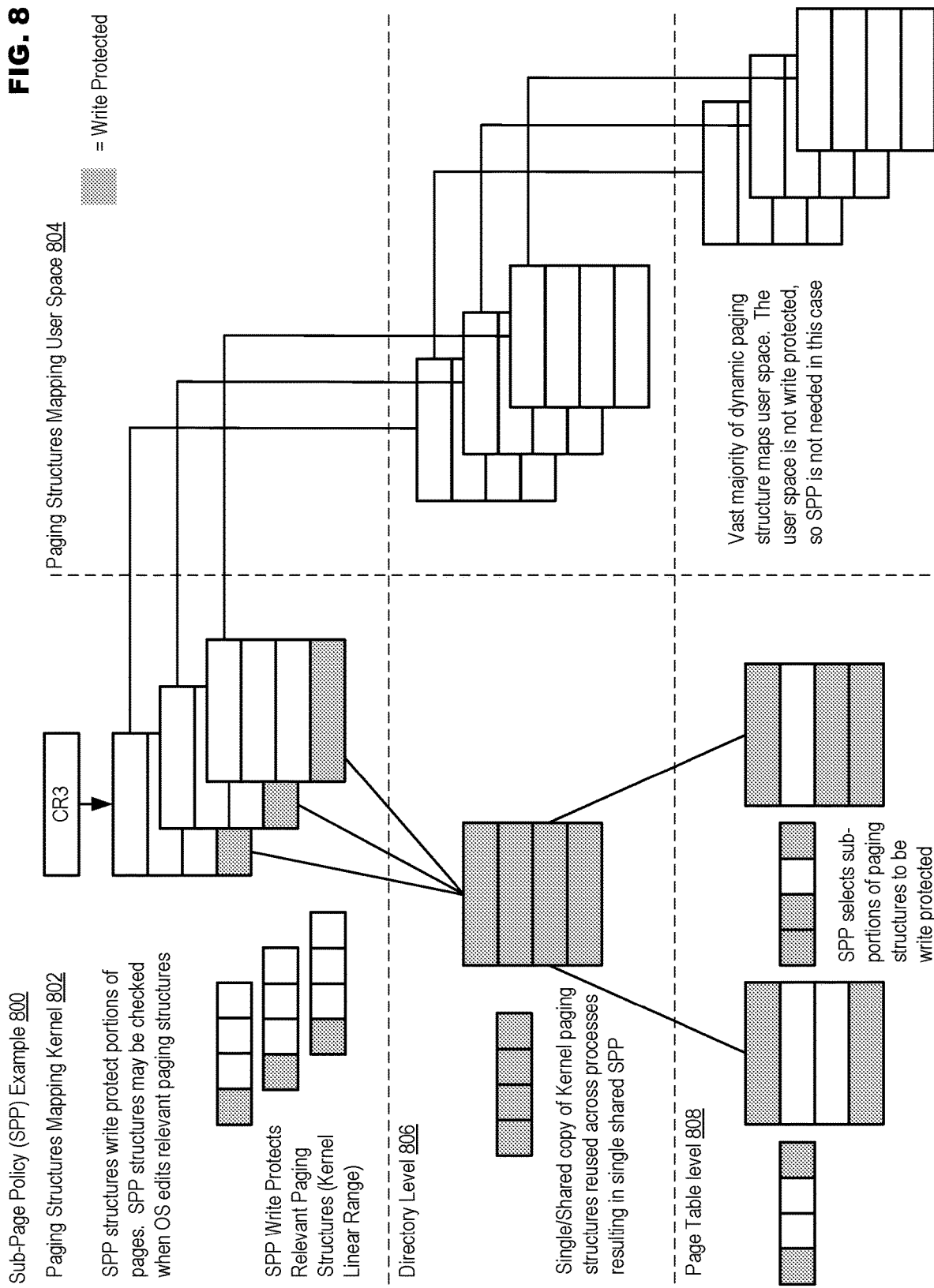
FIG. 8 illustrates an example implementation of sub-page policy (SPP) protection in accordance with at least one embodiment of the present disclosure.

FIG. 8 illustrates an example implementation of SPP protection in accordance with at least one embodiment of the present disclosure. SPP example 800 demonstrates an SPP-based approach to protecting virtual-to-physical memory mappings. Some assumptions may be made to better comprehend example 800. The OS may have a specific linear range wherein to protect the memory mappings, which may be largely invariant during regular operation. An option may exist to open "holes" within this linear range for exceptions. These holes may be dynamic (e.g., may be mapped for use within the user space), and thus may not require protection. When using SPP, holes may be opened by write-protecting only portions of the OS paging structures. This may be accomplished by, for example, protecting down entire linear ranges and then allowing certain portions within the linear range to be unprotected to allow for dynamic OS control of the page mappings. This may not require extra page walks as the SPP policy may only be checked when the OS edits paging structures instead of when the PMH walks them. SPP implementation may also help to address the issue of A/D bit assists with page table edit control, as SPP may be configured to allow the PMH to allow writes to specific bits within an SPP-protected page to, for example, update the A/D bit without generating a costly fault. In at least one embodiment, a "write permissibility" bit may be set by the VMM in the associated EPT entry to indicate that the PMH is allowed to write to the A/D bits, even if the pages have a non-writable (e.g., read-only) permission set.

Example 800 illustrates different mapping structures at different levels to demonstrate how regions of memory may be protected. Paging structures mapping kernel 802 may include memory structures to be protected via a protection scheme such as SPP, while paging structure mapping user space 804 include memory locations that may be dynamic (e.g., change frequently with normal device operation) and thus do not require protection via SPP. The CR3 register may provide a root address that may change based on, for example, the particular software loaded in device 100. The shaded portions of the paging structures mapping kernel 802 may be portion of memory that correspond to the particular CR3 root that require protection via SPP. In at least one embodiment, at least the contents these memory regions may remain constant for a particular CR3 root (e.g., as opposed to the paging structure mapping user space 804 that may be variable). Certain bits (e.g., A/D bits) may change based on how the portions of the memory are accessed. SPP may allow for bits to be accessed and/or written to without causing an exception/interrupt by protecting only certain portions of memory pages.

Directory level 806 demonstrates how a single/shared copy of kernel paging structures may be reused across processes. As a result, a single shared region that is protected by SPP may exist. Similarly, in page table level 808 SPP may be used to selectively protect different sub-regions of the page tables/EPT. In this manner, the granularity of protection may be increased to avoid the number of exceptions/interrupts generated, which may reduce processing overhead.

SPP may be beneficial at least because it improves a more general capability to protect memory pages (e.g., EPT memory page permission control) at a granularity finer than 4 KB. To avoid VM exits when switching processes by modifying the CR3 register, root paging structures may be tracked for each CR3 value using something such as, for example, an isRoot EPT entry bit (e.g., isCR3Target bit) or CR3-Target List (CR3-TL). However, if an OS reuses CR3 target pages it may be most straightforward to utilize SPP to protect these memory mappings. The rest of the kernel paging structures do not have to be shared across CR3s. Even if each CR3 has a unique paging structure, it may be assumed that the protected mappings will be the same, and thus the SPP policy may be the same even though each (e.g. PML4) structure may comprise different values for the protected mappings. When PML4's are recycled (e.g., and/or other CR3 targets depending on mode), an SPP scheme employing isRoot may avoid VM Exits that would otherwise have been triggered by a MOVCR3, a new process creation, an OS modification of the paging structures (e.g., or sub-pages that aren't made immutable/protected), etc. As a result, this approach may be deemed the inverse of page table edit control: edits are specifically allowed.

For paging structures that require no protection at all, either of the following approaches may be employed. First, the entire paging structure may be write-protected using EPT but then SPP may be employed to allow writes to some or all of the entire structure. Alternatively, the EPT page permission for the entire paging structure may be set to read/write to allow for read and/or writes to addresses within the address range of the page. The latter option may be more efficient based on the expected performance of SPP.

With regard to the PML4 tables (or other CR3 target pages depending on the mode), the hypervisor may mark each read-only with EPT and then use SPP to allow writes to e.g. the lower half (which presumably maps user addresses). When not set, the IsRoot bit may cause a VM exit on a MOV command to CR3, or on some instruction (e.g., likely the first instruction). If it is possible for the OS to recycle PML4s, then a VM exit should not be triggered. If it is not possible to recycle PML4s (e.g., or a similar root paging structure), then having CR3 point to a GPA marked as isRoot==FALSE in the EPTE may result in a VM exit the first time the PMH actually performs a page walk. CR3 Target List (CR3-TL) may be used in place of defining an isRoot or CR3 Target Page bits in an EPT entry (EPTE). However, isRoot may be the most scalable approach. Process context identifiers (PCIDs) may not be an issue if the protected regions are the same across CR3s. When performing a walk through the paging structures, the PMH may check the EPTE leaf node for the CR3 GPA. If isRoot is set, the PMH may continue walking the paging structures. If isRoot is not set, then the PMH may, for example, trigger a fault or notify the processor microcode, which may select the correct notification method for software (e.g., a # PF, a VM exit or other event).

Consistent with the present disclosure, SPP may write protect 128-byte size blocks of memory. The granularity (e.g., the smallest unit of memory that SPP may protect) may be set by software. The granularity may also be selectable entry-by-entry, which may be accomplished by introducing conditional controls into the microcode (uCode) controlling processing circuitry 104. In at least one embodiment, SPP protected block sizes may be reduced to 8 bytes, the same size of a single page table entry. 8-byte granularity would result in 512 bits (64 bytes) per page, or one full line of cache memory. Preventing VM exits when protecting paging structures, even when the protected mappings are dispersed as 4K pages, and then reducing to 8 bytes may enable each SPP bit to correspond to an 8-byte aligned entry in a paging structure page. 128 Bytes is not an inherent limit for SPP. The bit vector is currently defined as 64 bits, and that size fit well with the original SPP usages. Adding more bits to the bit vector would allow SPP precision all the way down to 8 bytes or 1 page table entry per SPP write-protect bit.

SPP may be much faster than relying upon a VM exit. The main issue would be PML4, which may change on every new process. The user space pages may be all read/write, so the vast majority of paging structures would see no overhead due to SPP. Marking all the PML4 structures as isRoot may allow a pool of PML4 structures to be reused, edited for the non-immutable portions, and reused as CR3 targets. Even without reuse, the worst case for isRoot may be a VM exit when a new process is created. Normal task switching may not cause VM exits in this instance. For example, if the OS keeps a pool of PML4 hot pages, which are always reused as PML4 paging structures, then there may be no VM Exit as the correct SPP an isRoot policy is already applied for these pages. The OS may update the user-space portion of a retired PML4 page, which may be allowed without VM Exits by SPP, and then reuse it as a CR3 target for a new process.

In a typical implementation not all the paging structures require write-protection. Only the paging structures that may correspond to immutable memory mappings require SPP. No edits by the OS are expected for immutable memory mappings except in abnormal cases or in cases of error or attack. If the protected regions are scattered sparsely and uniformly across the kernel address space, there is no use of SPP for the PDP tables and page directories that map the kernel address space (e.g., and possibly half the PML4 table). So SPP may be applied when a paging structure is both to be edited by the OS and protected at the same time, and just straight page-level permissions can be applied to protect whole page paging structures, or the entirety of the paging structure pages may be left writable. The IsRoot bit in the EPTE may be an indicator that the structure is PML4 or a CR3 target, and as a result an implicit write-protection policy may be applied (e.g., a kernel-relevant portion of the PML4 structure may be write-protected). Here the processor may apply an implicit SPP policy on those identified pages when accessed, thus, avoiding any SPP table walks or additional memory lookups when software edits such pages. It may be unlikely for an OS to modify the upper-level structures with frequency, so keeping them all fully write protected (e.g., using SPP only for page tables) may provide adequate protection.

Figure 9:
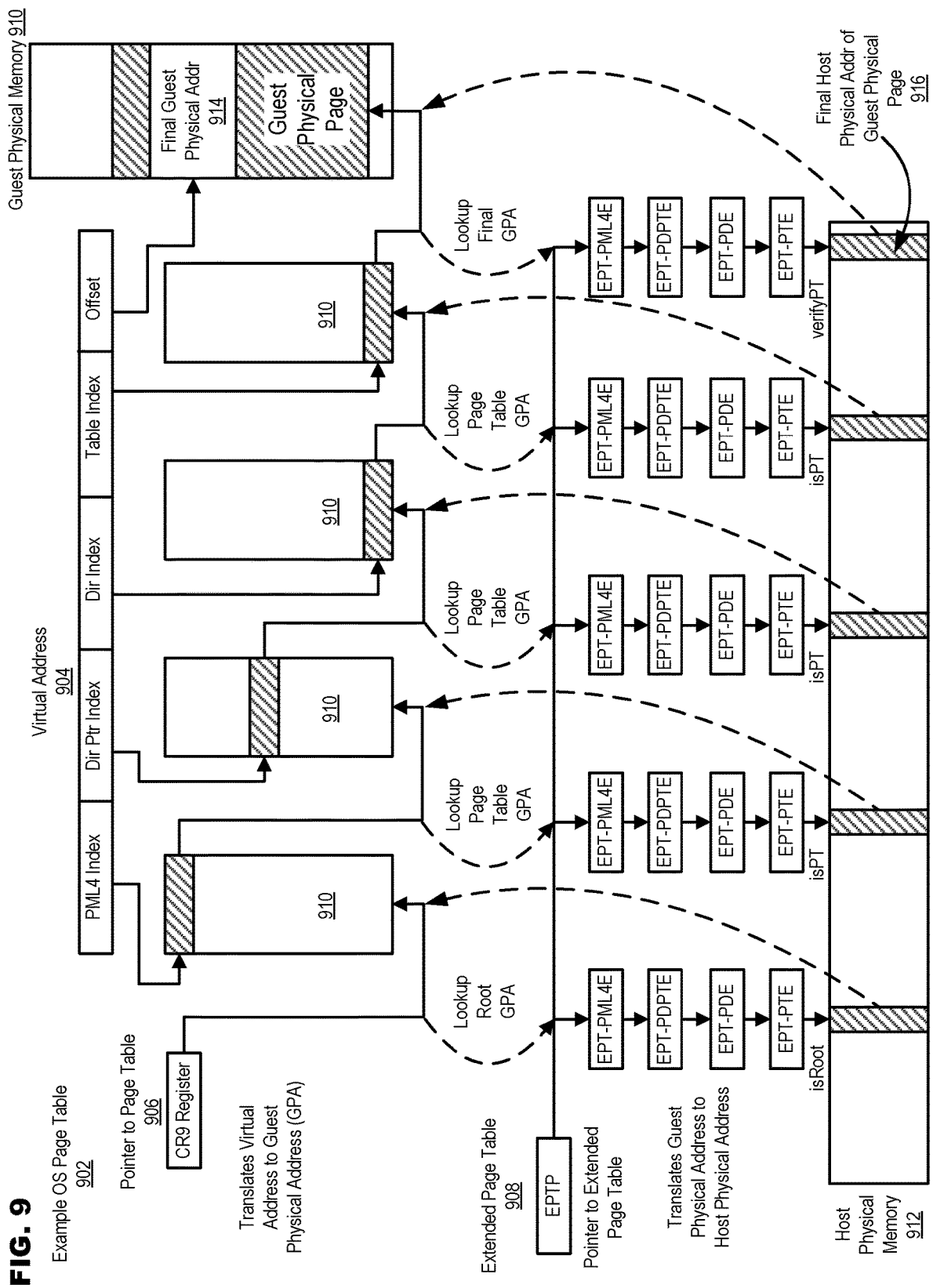
FIG. 9 illustrates an example of is page tables (ISPT) and bit placements in accordance with at least one embodiment of the present disclosure.

FIG. 9 illustrates an example of is page tables (ISPT) and bit placements in accordance with at least one embodiment of the present disclosure. For example, a Verify Page-Map (VP or verifyPT) bit may be defined for EPTE leafs that may indicate when protection is required for a GPA. When the verify bit is set in a leaf EPT entry, this may indicate to the PMH that the entire paging structure path walked to reach that entry must be write-protected. If any entry along the path was not write-protected, then the PMH may generate a fault, or may indicate the lack of protection to processor ucode, which may select the appropriate event type reported to the OS or VMM. An isPT bit (e.g., a write-permissibility (WP) bit) may be added to indicate that A/D bit assists are allowed when paging structures are otherwise write protected. The possible locations of these bits are shown in example OS page table 903 in FIG. 9.

As illustrated in example OS page table 902, virtual address 904 may be translated into a GPA 914 in guest physical memory 910 using OS page tables 902. EPTs 908 may be used to translate the GPA to a HPA 916 in host physical memory 912. The virtual address 904 may be partitioned into a number of regions or bit fields. For example, in the instance of a 4-level IA-32e paging mode, the fields are, from left to right: a page map level 4 (PML4) index, a directory pointer index, a directory index, a table index and an offset. The use of other paging modes, for example a 3-level Physical Address Extension (PAE) paging mode, is also possible.

The page table walk may begin by obtaining a pointer 906 to the page table from the processor's CR3 register. This pointer may be in the form of a GPA which is translated to host physical memory through the EPT hierarchy (e.g., paging structure) 908. The traverse of the EPT hierarchy, or tree, begins with the EPT pointer that may specify the first paging structure for a guest, and progresses through layers including, for example, root layer EPT Page Map Level 4 Entry (EPT-PML4E), EPT Page Directory Pointer Table Entry (EPT-PDPTE) EPT Page Directory Entry (EPT-PDE) down to the EPT Page Table Entry (EPT-PTE) which is the leaf. A first indicator, referred to here as an "isRoot" bit, in the EPT leaf entry may be used to indicate that the associated GPA page address is a page table root (referenced by CR3). The GPA root is then used in combination with the PML4 Index from the virtual address 904 to a first page table GPA from guest physical memory 910. The process may be repeated to obtain subsequent levels of page table GPAs as illustrated. During this process the isPT bit in the EPT leaf entries may be used to indicate that the associated GPA page address is accessible to the processor's PMH. The final or rightmost page walk loop produces a link between the final GPA 914 and the final host physical address 916.

In at least one embodiment, all the root paging structures may have the same SPP policy. Pages having the same SPP policy may be identified by, for example the isRoot bit in the EPTE (e.g., the PML4 paging structure). Since these pages have the same SPP policy/bit-vector, for "isRoot" marked pages (e.g., as specified in the page's corresponding EPT entry) a default sub-page policy/bit-vector may be employed. Basically, an SPP bit vector may apply to all "isRoot" marked pages for a guest VM. As a result, processing circuitry 104 may avoid redundantly looking up the same bit vector in the SPP table for the root/PML4 pages based on their address whenever software attempts to edit those pages. The VMCS structure may contain this one bit vector for "isRoot"-marked pages in each guest VM. In at least one embodiment, the OS may then recycle isRoot-marked pages. For example, the OS may recycle PML4 paging structures, retrieving the same per-session mappings from a pool of PML4 pages with the correct top level content for the write-protected portion of the paging structures.

Figure 10:
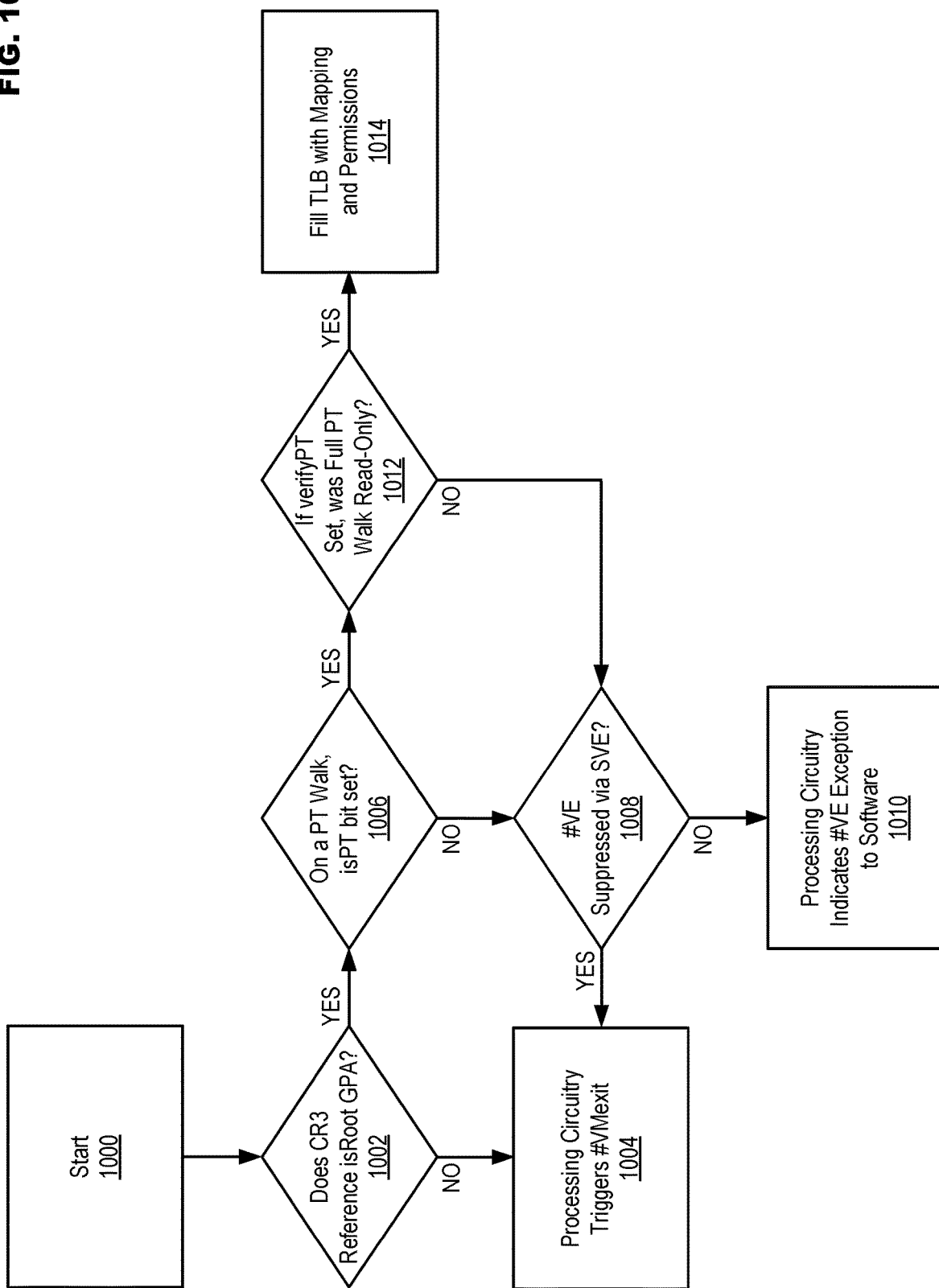
FIG. 10 illustrates example operations for a page walk for a page miss handler (PMH) in accordance with at least one embodiment of the present disclosure.

FIG. 10 illustrates example operations for a page walk for a page miss handler (PMH) in accordance with at least one embodiment of the present disclosure. The operations illustrated in FIG. 10 are in the context of the additional indicator bits set in the EPTE as shown, for example, in FIG. 9. Following start operation 1000 a determination may be made in operation 1002 as to whether the CR3 references an isRoot GPA. If in operation 1002 it is determined that the CR3 does not reference and isRoot GPA, then in operation 1004 a VM exit may be triggered. On the other hand, if in operation 1002 it is determined that the CR3 references an isRoot GPA, then in operation 1006 the page table (PT) walk may commence and a determination may be made as to whether the isPT bit is set (e.g., to indicate that A/D assists are allowed when paging structures are otherwise protected). If in operation 1006 it is determined that the isPT bit is not set, then in operation 1008 a further determination may be made as to whether the virtualization exception (# VE) has been suppressed (e.g., by a Suppress # VE). A determination in operation 1008 that # VE has been suppressed may be followed by a return to operation 1004 to trigger a VM exit. If in operation 1008 it is determined that # VE has not been suppressed, then in operation 1010 the processing circuitry may indicate a # VE to software in the device.

Returning to operation 1006, if it is determined that the isPT bit is set, then in operation 1012 a determination may be made as to, if a verifyPT bit is set (e.g., defined for EPTE leafs to indicate when protection is required for a GPA), whether was the full PT walk read-only (e.g., that no writes were attempted during the PT walk). A determination in operation 102 that the full PT walk was not read-only may be followed by a return to operation 1008 to determine whether # VE has been suppressed. If in operation 1012 it is determined that, if verify PT was set, that the full PT walk was read-only, then in operation 1014 the TLB may be filled with mapping and permission based on, for example, the translated addresses from the PT walk.

The SPP may also be indicated by a SPP bit in EPT entries. When set, the bit may indicate to processing circuitry 104 that the following table structure may be checked to determine if the specific portion of the page being written is allowed to be modified based on the address of the page being edited.

Figure 11:
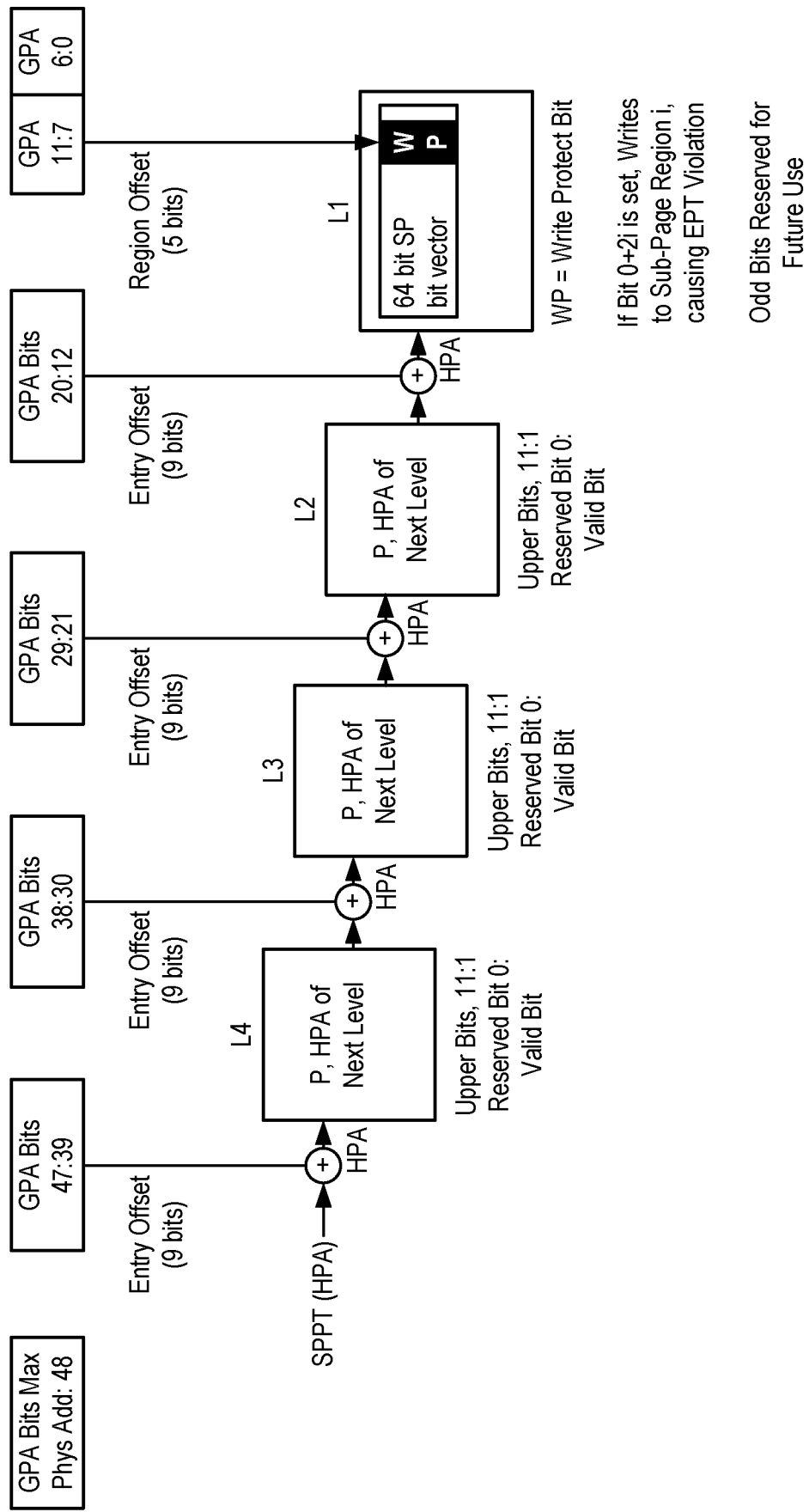
FIG. 11 illustrates an example 48 bit SPP table structure in accordance with at least one embodiment of the present disclosure.

FIG. 11 illustrates an example 48 bit SPP table structure in accordance with at least one embodiment of the present disclosure. Example 48 bit SPP table structure 1100 demonstrates how address translation may be carried out in accordance with SPP protection. An SPP table output may be supplied as an input to table structure 1100. The table may traverse from left to right wherein each portion of the linear (e.g., virtual) address may be translated into a HPA until a 64 bit vector is generated as the output. In at least one embodiment, the resulting 64-bit vector may comprise a write protect (WP) bit. For example, if bit 0+2i is set to enable write-protection of a corresponding sub-page region, writes to the sub-page region may cause an EPT permission violation. Odd bits may be reserved for future use. The WP bit is but one example of a bit that may be desirable to access within a specific sub-page region. More importantly, SPP may grant access control resolution down to the bit level for any bit or larger region up to an entire memory page. Thus, it may be possible to selectively protect different regions of memory of variable size with granularity down to the bit level.

Figure 12:
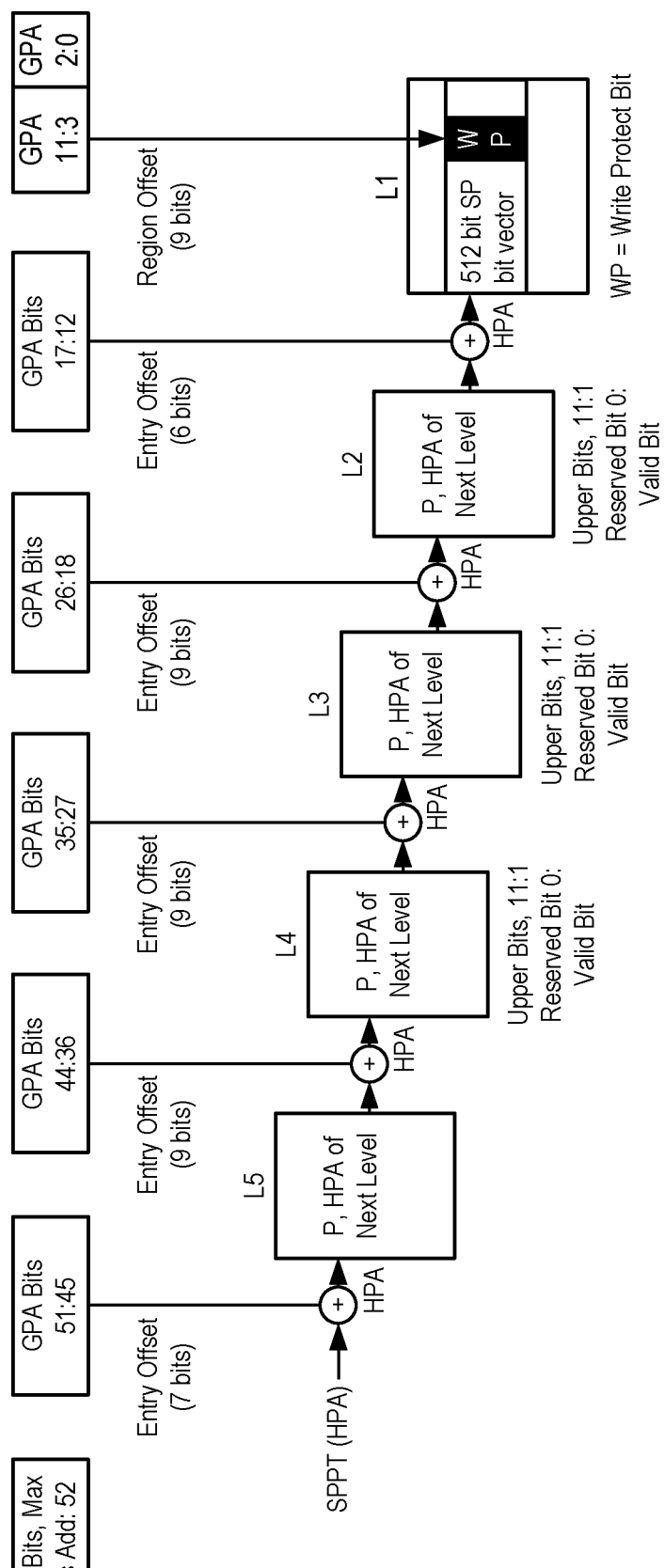
FIG. 12 illustrates an example 52 bit SPP table structure in accordance with at least one embodiment of the present disclosure.

FIG. 12 illustrates an example 52 bit SPP table structure in accordance with at least one embodiment of the present disclosure. Example 52 bit SPP table structure 1200 illustrates an alternative implementation to example 1100 disclosed in FIG. 11. The 52 bit-implementation shown in example 1200 may be utilized for mapping 52-bit page addresses (e.g., GPAs) to their corresponding SPP policies. Moreover, the resulting 512-bit SP bit vector matches the size of a cache line for existing cache memory implementations for processing circuitry 104. This may allow individual 8-byte page table entries to be individually write-protected. Moreover, similar WP bit functionality may be implemented in example 1200 as described above with respect to example 1100.

Additionally, pages marked as isRoot or isPT (e.g., having corresponding isRoot or isPT bits set) may have a bit-level mask specified that may allow certain bits to be accessed/modified including by software (e.g., the OS). For example, the A/D bits or other bits encompassed by the bit mask may be accessed by software, even if EPT and/or SPP policies specify the entries are to be write-protected. In this instance, processing circuitry 104 will use the mask to verify that only the masked bits were modified on a write operation, and the contents of the other bits were left unchanged. In at least one embodiment, processing circuitry 104 may verify only masked bits were changed by emulating the memory writes. Processing circuitry 104 may initially read the previous SPP-protected page table entry, store the modification attempt in a register and then compare that the unmasked region did not change. If the unmasked region is determined to be unchanged, processing circuitry 104 may write the modified entry back to memory. Otherwise, if unmasked bits were changed then processing circuitry 104 may generate a fault/VM exit.

Combined Operation

Figure 13:
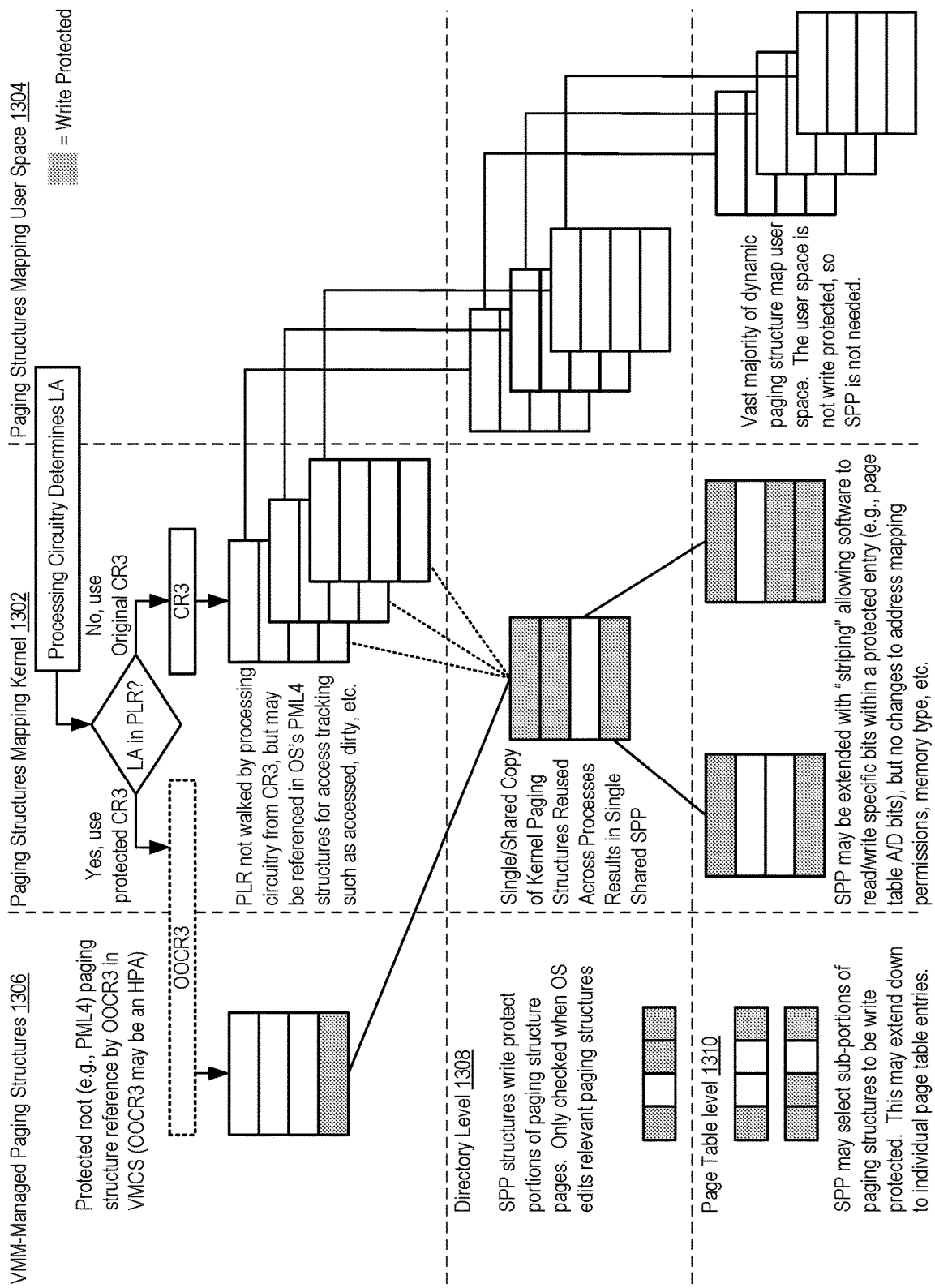
FIG. 13 illustrates an example combining HBLAT with SPP to protect address mapping and translation in accordance with at least one embodiment of the present disclosure.

FIG. 13 illustrates an example combining HBLAT with SPP to protect address mapping and translation in accordance with at least one embodiment of the present disclosure. In general, the concept of a PLR may be used to access a VMM-managed root paging structure such as the previously described HBLAT 206. HBLAT 206 may reference back to paging structures in the OS that may be protected by SPP, or alternatively write-protected by EPT permission on a per-page basis. The OS may see a "combined view," allowing the protection to be compatible with an unmodified OS expecting to view and manage legacy paging structures, access A/D bits, etc.

Similar to SPP implementation example 800, combined implementation example 1300 is divided into different regions representing different types of memory structures at various levels. Further to paging structure mapping kernel 1302 and paging structures mapping user space 1304, combined implementation example 1300 may comprise VMM-managed paging structures 1306. VMM-manage paging structures 1306 may be based on VMXroot and may comprise EPT, SPP, etc. Paging structures 1302, 1304 and 1306 may each comprise structures at directory level 1308 and page table level 1310.

An example of operation is provided below. Similar to the behavior described above in regard to HBLAT 206, processing circuitry 104 may initially determine an LA for a command that was received, and then determine whether the LA is in the PLR. If the LA is determined to not be within the PLR, then an original CR3 may be used as a root to perform a page walk using one or more page tables. As shown in FIG. 13, the page walk may proceed into the unsecured user space and may eventually translate the provided LA into an HPA. However, if the LA is determined to be within the PLR, then a protected CR3 may be used (e.g., an "opt-out" CR3 or OOCR3). The OOCR3 may be an HPA and may reference protected root paging structures (e.g., PML4). In at least one embodiment, the PLR may not be walked by the processing circuitry from the CR, but may still be referenced in the PML4 of the OS for access tracking (e.g., for tracking accessed/dirty (A/D) bits, etc.).

As illustrated in directory level 1308, SPP structures may write protect portions of the paging structure pages. The configuration of the SPP protection may only be checked and/or modified when an OS edits relevant paging structures, which may help to minimize the fault and/or exceptions that are generated (e.g., and similarly data processing overhead). At page table level 1310, SPP may selectively protect sub-portions of the paging structures by making them write-protected. This protection may extend down to individual page table entries, and may be controlled on a bit-level basis to allow for writes to certain bits that may be written-to regularly on the kernel side (e.g., A/D bits).

At least SPP may further be combined with page "striping" protection. An example of page striping protection is described in U.S. Pat. No. 7,757,035. In at least one embodiment, page striping may be a processor enhancement that helps to reduce the number of page faults and/or corresponding VM exits in the system. It essentially introduces the concept of "striping" certain bits on memory pages (e.g., based on a stripe bit mask) so that a processor page fault may occur only if those bits on the pages were modified. For example, if the Present/Not Present bits were striped for pages containing a page table, only changes to those bits could possibly cause a page fault (# PF). Any modification of the state of other bits such as A/D bits, etc. would not cause a # PF. Page striping may be used in conjunction with SPP to allow specific individual bits in an entry to be edited (e.g., A/D bits, software available bits, etc.). This may allow software to edit non-consequential bits within a SPP write-protected entry, without causing a VM exit or # PF, but may still protect the address mapping, permissions and memory type bits within the SPP-protected sub-page portion from modification by software.

The SPP structure may also be defined independently of EPTs. In this instance, it would be an extension to the OS paging structures. For example, SPP may be initiated, configured, etc. early in the boot process to protect OS paging structures without a VMM. In this way, SPP may, in the context of valid CR3 targets, protect virtual-to-physical memory mappings without requiring VMM-based edit control of paging structures.

While FIGS. 7 and 10 illustrate operations according to different embodiments, it is to be understood that not all of the operations depicted in FIGS. 7 and 10 are necessary for other embodiments. Indeed, it is fully contemplated herein that in other embodiments of the present disclosure, the operations depicted in FIGS. 7 and 10, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software circuitry executed by a programmable control device.

Thus, this disclosure is directed to a system for address mapping and translation protection. In one embodiment, processing circuitry may include a virtual machine manager (VMM) to control specific guest linear address (GLA) translations. Control may be implemented in a performance sensitive and secure manner, and may be capable of improving performance for critical linear address page walks over legacy operation by removing some or all of the cost of page walking extended page tables (EPTs) for critical mappings. Alone or in combination with the above, certain portions of a page table structure may be selectively made immutable by a VMM or early boot process using a sub-page policy (SPP). For example, SPP may enable non-volatile kernel and/or user space code and data virtual-to-physical memory mappings to be made immutable (e.g., non-writable) while allowing for modifications to non-protected portions of the OS paging structures and particularly the user space.

The following examples pertain to further embodiments. The following examples of the present disclosure may comprise subject material such as devices, methods, at least one machine-readable medium for storing instructions that when executed cause a machine to perform acts based on the method, means for performing acts based on the method and/or systems for address mapping and translation protection.

According to example 1 there is provided a device to protect address translation. The device may comprise memory circuitry including at least one virtual machine (VM) in which an operating system executes, at least one operating system (OS)-administered page table to translate a linear memory address utilized by the OS into a physical memory address within the memory circuitry, at least one virtual machine manager (VMM)-administered page table to translate the linear memory address into the physical memory address when the linear memory address is determined to fall in a protected linear range (PLR) and processing circuitry including at least one VMM to receive a command indicating the linear address to translate to the physical address, determine if the linear address falls within the PLR, utilize the at least one OS-administered page table to translate the linear address into the physical address when the linear address is determined to not fall within the PLR, and utilize the at least one VMM-administered page table to translate the linear address into the physical address when the linear address is determined to fall within the PLR.

Example 2 may include the elements of example 1, wherein the processing circuitry is to cause the at least one VMM to perform a page walk through at least one of the at least one OS-administered page table or the at least one VMM-administered page table to translate the linear address into the physical address.

Example 3 may include the elements of any of examples 1 to 2, wherein the processing circuitry is to cause the at least one VMM to base the address translation on a root address set in a CR3 control register of the processing circuitry when the linear address is determined to not fall within the PLR.

Example 4 may include the elements of any of examples 1 to 3, wherein the processing circuitry is to cause the at least one VMM to base the address translation on a root address set in an opt-out CR3 (OOCR3) control register of the processing circuitry when the linear address is determined to fall within the PLR.

Example 5 may include the elements of any of examples 1 to 4, wherein the processing circuitry is to utilize the at least one VMM-administered page table to translate the linear address into the physical address based on a setting of an opt-in bit in the at least one VMM-administered page table.

Example 6 may include the elements of example 5, wherein the processing circuitry is to suppress page faults generated by the at least one VMM-administered page table based on a setting of a suppression bit.

Example 7 may include the elements of any of examples 5 to 6, wherein the processing circuitry is to restart a page walk originally initiated using the at least one VMM-administered page table using the at least one OS-administered page table on a transaction lookaside buffer (TLB) miss.

Example 8 may include the elements of any of examples 1 to 7, wherein the processing circuitry is to, when already utilizing the at least one VMM-administered page table to translate the linear address into the physical address, divert to utilizing the at least one OS-administered page table to translate the linear address into the physical address based on a setting of an opt-in bit in the at least one VMM-administered page table.

Example 9 may include the elements of any of examples 1 to 8, wherein the processing circuitry is to determine that the physical address corresponds to a location within a portion of a memory page linked to the at least one OS-administered page table protected by a sub-page policy (SPP).

Example 10 may include the elements of example 9, wherein the processing circuitry is to determine whether a mask exists on the portion of the memory page to allow at least certain bits within the portion of the memory page to be accessed regardless of the SPP.

Example 11 may include the elements of any of examples 1 to 10, wherein the processing circuitry is to determine that the physical address corresponds to a location within a portion of a memory page linked to the at least one OS-administered page table protected by a sub-page policy (SPP) and determine whether a mask exists on the portion of the memory page to allow at least certain bits within the portion of the memory page to be accessed regardless of the SPP.

Example 12 may include the elements of any of examples 1 to 11, wherein the processing circuitry is further to store the physical address in a translation lookaside buffer (TLB).

According to example 13 there is provided a method for protecting address translation. The method may comprise loading a virtual machine manager (VMM) into processing circuitry in a device, receiving a command indicating a linear address to convert into a physical address, determining if the linear address falls within a protected linear range (PLR), translating the linear address into the physical address utilizing at least one OS-administered page table in memory circuitry in the device when the linear address is determined to not fall within the PLR and translating the linear address into the physical address utilizing at least one VMM-administered page table in the memory circuitry when the linear address is determined to fall within the PLR.

Example 14 may include the elements of example 13, wherein translating the linear address into the physical address comprises performing a page walk through at least one of the at least one OS-administered page table or the at least one VMM-administered page table.

Example 15 may include the elements of any of examples 13 to 14, wherein the address translation is based on a root address set in a CR3 control register of the processing circuitry when the linear address is determined to not fall within the PLR.

Example 16 may include the elements of any of examples 13 to 15, wherein the address translation is based on a root address set in an opt-out CR3 (OOCR3) control register of the processing circuitry when the linear address is determined to fall within the PLR.

Example 17 may include the elements of any of examples 13 to 16, and may further comprise utilizing the at least one VMM-administered page table to translate the linear address into the physical address based on a setting of an opt-in bit in the at least one VMM-administered page table.

Example 18 may include the elements of example 17, and may further comprise suppressing page faults generated by the VMM-administered page table based on a setting of a suppression bit.

Example 19 may include the elements of any of examples 17 to 18, and may further comprise restarting a page walk originally initiated using the at least one VMM-administered page table using the at least one OS-administered page table on a transaction lookaside buffer (TLB) miss.

Example 20 may include the elements of any of examples 13 to 19, and may further comprise, when utilizing the at least one VMM-administered page table to translate the linear address into the physical address, diverting to utilizing the at least one OS-administered page table to translate the linear address into the physical address based on a setting of an opt-in bit in the at least one VMM-administered page table.

Example 21 may include the elements of any of examples 13 to 20, and may further comprise determining that the physical address corresponds to a location within a portion of a memory page linked to the at least one OS-administered page table protected by a sub-page policy (SPP).

Example 22 may include the elements of example 21, and may further comprise determining whether a mask exists on the portion of the memory page to allow at least certain bits within the portion of the memory page to be accessed regardless of the SPP.

Example 23 may include the elements of any of examples 13 to 22, and may further comprise determining that the physical address corresponds to a location within a portion of a memory page linked to the at least one OS-administered page table protected by a sub-page policy (SPP) and determining whether a mask exists on the portion of the memory page to allow at least certain bits within the portion of the memory page to be accessed regardless of the SPP.

Example 24 may include the elements of any of examples 13 to 23, and may further comprise storing the physical address in a translation lookaside buffer (TLB).

According to example 25 there is provided a system including at least one device, the system being arranged to perform the method of any of the above examples 13 to 24.

According to example 26 there is provided a chipset arranged to perform the method of any of the above examples 13 to 24.

According to example 27 there is provided at least one machine readable medium comprising a plurality of instructions that, in response to be being executed on a computing device, cause the computing device to carry out the method according to any of the above examples 13 to 24.

According to example 28 there is provided at least one device equipped to protect address translation, the at least one device being arranged to perform the method of any of the above examples 13 to 24.

According to example 29 there is provided a system for protecting address translation. The system may comprise means for loading a virtual machine manager (VMM) into processing circuitry in a device, means for receiving a command indicating a linear address to convert into a physical address, means for determining if the linear address falls within a protected linear range (PLR), means for translating the linear address into the physical address utilizing at least one operating system (OS)-administered page table in memory circuitry in the device when the linear address is determined to not fall within the PLR and means for translating, utilizing the VMM, the linear address into the physical address utilizing at least one VMM-administered page table in the memory circuitry when the linear address is determined to fall within the PLR.

Example 30 may include the elements of example 29, wherein the means for translating the linear address into the physical address include means for performing a page walk through at least one of the at least one OS-administered page table or the at least one VMM-administered page table.

Example 31 may include the elements of any of examples 29 to 30, wherein the address translation is based on a root address set in a CR3 control register of the processing circuitry when the linear address is determined to not fall within the PLR.

Example 32 may include the elements of any of examples 29 to 31, wherein the address translation is based on a root address set in an opt-out CR3 (OOCR3) control register of the processing circuitry when the linear address is determined to fall within the PLR.

Example 33 may include the elements of any of examples 29 to 32, and may further comprise means for utilizing the at least one VMM-administered page table to translate the linear address into the physical address based on a setting of an opt-in bit in the at least one VMM-administered page table.

Example 34 may include the elements of example 33, and may further comprise means for suppressing page faults generated by the VMM-administered page table based on a setting of a suppression bit.

Example 35 may include the elements of any of examples 33 to 34, and may further comprise means for restarting a page walk originally initiated using the at least one VMM-administered page table using the at least one OS-administered page table on a transaction lookaside buffer (TLB) miss.

Example 36 may include the elements of any of examples 29 to 35, and may further comprise means for, when utilizing the at least one VMM-administered page table to translate the linear address into the physical address, diverting to utilizing the at least one OS-administered page table to translate the linear address into the physical address based on a setting of an opt-in bit in the at least one VMM-administered page table.

Example 37 may include the elements of any of examples 29 to 36, and may further comprise means for determining that the physical address corresponds to a location within a portion of a memory page linked to the at least one OS-administered page table protected by a sub-page policy (SPP).

Example 38 may include the elements of example 37, and may further comprise means for determining whether a mask exists on the portion of the memory page to allow at least certain bits within the portion of the memory page to be accessed regardless of the SPP.

Example 39 may include the elements of any of examples 29 to 38, and may further comprise means for determining that the physical address corresponds to a location within a portion of a memory page linked to the at least one OS-administered page table protected by a sub-page policy (SPP) and means for determining whether a mask exists on the portion of the memory page to allow at least certain bits within the portion of the memory page to be accessed regardless of the SPP.

Example 40 may include the elements of any of examples 29 to 39, and may further comprise storing the physical address in a translation lookaside buffer (TLB).

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:
1. A processor, comprising:
processor circuitry configured to:
  execute a host operating system; and
  execute a hypervisor, the hypervisor configured to execute a guest operating system; and
memory circuitry communicatively coupled to the processor circuitry, the memory circuitry including machine-readable instructions that, when executed by the processor circuitry, cause the processor circuitry to:
  determine whether a first received linear address included in a first received command is included in a processor protected linear range (PLR);
  responsive to a first determination that the first received linear address included in the first received command falls outside the processor protected linear range:
    convert the first received linear address to a first hardware physical address (HPA) using a first page table; and
    provide a first guest linear address mapping to the first HPA to translation lookaside buffer (TLB) circuitry;
  responsive to a second determination that a second received linear address included in a second received command falls inside the processor protected linear range:
    convert the second received linear address to a second HPA using a second page table; and
    provide a second guest linear address mapping to the second HPA to the TLB circuitry.

2. The system of claim 1, wherein the first page table comprises an extended page table (EPT) administered by the host operating system.

3. The system of claim 1, wherein the second page table comprises an extended page table administered by the hypervisor.

4. The system of claim 1, further comprising cache circuitry coupled to the processor circuitry, wherein the cache circuitry includes the TLB circuitry.

5. The system of claim 1, wherein the first received command includes at least one of: a CR3 control register load, an extended page table pointer, and a new control register load.

6. The system of claim 1, wherein the machine-readable instructions that, when executed by the processor circuitry, cause the processor circuitry to convert the first received linear address to the first HPA using the first page table further cause the processor circuitry to:
generate a first guest linear address based on the first received linear address; and
convert the first guest linear address to the first HPA using the first page table.

7. The system of claim 1, wherein the machine-readable instructions, when executed by the processor circuitry, cause the processor circuitry to convert the second received linear address to the second HPA using the second page table further cause the processor circuitry to:
generate a second guest linear address based on the second received linear address; and
convert the second guest linear address to the second HPA using the first page table.

8. The system of claim 1, wherein the first HPA and the second HPA are the same HPA.

9. An address translation method, comprising:
determining, by processor circuitry, whether a first received linear address included in a first received command is included in a processor protected linear range (PLR);
responsive to a first determination that the first received linear address included in the first received command falls outside the processor protected linear range:
converting, by the processor circuitry, the first received linear address to a first hardware physical address (HPA) using a first page table; and
providing, by the processor circuitry, a first guest linear address mapping to the first HPA to translation lookaside buffer (TLB) circuitry communicatively coupled to the processor circuitry;
responsive to a second determination that a second received linear address included in a second received command falls inside the processor protected linear range:
converting, by the processor circuitry, the second received linear address to a second HPA using a second page table; and
providing, by the processor circuitry, a second guest linear address mapping to the second HPA to the TLB circuitry.

10. The method of claim 9, wherein the converting the first received linear address to the first HPA using the first page table further comprises:
converting, by the processor circuitry, the first received linear address to the first HPA using an extended page table administered by a host operating system (O/S) executed by the processor circuitry.

11. The method of claim 9, wherein converting the second received linear address to the second HPA using the second page table further comprises:
converting, by the processor circuitry, the second received linear address to the second HPA using an extended page table administered by a hypervisor executed by the processor circuitry.

12. The method of claim 9, further comprising:
determining, by the processor circuitry, that the second received linear address included in the second received command is included in the processor protected linear range, wherein the second received command includes at least one of: a CR3 control register load, an extended page table pointer, and a new control register load.

13. The method of claim 9, wherein the converting the first received linear address to the first HPA using the first page table further comprises:
generating, by the processor circuitry, a first guest linear address based on the first received linear address; and
converting, by the processor circuitry, the first guest linear address to the first HPA using the first page table.

14. The method of claim 9, wherein the converting the second received linear address to the second HPA using the second page table further comprises:
generating, by the processor circuitry, a second guest linear address based on the second received linear address; and
converting, by the processor circuitry, the second guest linear address to the second HPA using the first page table.

15. A non-transitory storage device that includes machine-readable instructions that, when executed by processor circuitry, cause the processor circuitry to:
determine whether a first received linear address included in a first received command is included in a processor protected linear range (PLR);
responsive to a first determination that the first received linear address included in the first received command falls outside the processor protected linear range:
convert the first received linear address to a first hardware physical address (HPA) using a first page table; and
provide a first guest linear address mapping to the first HPA to translation lookaside buffer (TLB) circuitry communicatively coupled to the processor circuitry;
responsive to a second determination that a second received linear address included in a second received command falls inside the processor protected linear range:
convert the second received linear address to a second HPA using a second page table; and provide a second guest linear address mapping to the second HPA to the TLB circuitry.

16. The non-transitory storage device of claim 15, wherein the machine-readable instructions that, when executed by the processor circuitry, cause the processor circuitry to convert the first received linear address to the first HPA using the first page table further causes the processor circuitry to:
convert the first received linear address to the first HPA using an extended page table administered by a host operating system (O/S) executed by the processor circuitry.

17. The non-transitory storage device of claim 15, wherein the machine-readable instructions that, when executed by the processor circuitry, cause the processor circuitry to convert the second received linear address to the second HPA using the second page table further causes the processor circuitry to:
convert the second received linear address to the second HPA using an extended page table administered by a hypervisor executed by the processor circuitry.

18. The non-transitory storage device of claim 15, wherein the machine-readable instructions, when executed by the processor circuitry, further cause the processor circuitry to:
determine that the second received linear address included in the second received command is included in the processor protected linear range, wherein the second received command includes at least one of: a CR3 control register load, an extended page table pointer, and a new control register load.

19. The non-transitory storage device of claim 15, wherein the machine-readable instructions that, when executed by the processor circuitry, cause the processor circuitry to convert the first received linear address to the first HPA using the first page table further cause the processor circuitry to:
generate a first guest linear address based on the first received linear address; and
convert the first guest linear address to the first HPA using the first page table.

20. The non-transitory storage device of claim 15, wherein the machine-readable instructions that, when executed by the processor circuitry, cause the processor circuitry to convert the second received linear address to the second HPA using the second page table further cause the processor circuitry to:
generate a second guest linear address based on the second received linear address; and
convert the second guest linear address to the second HPA using the first page table.

* * * * *